United States Patent
Peyghambarian et al.

(10) Patent No.: US 8,731,356 B2
(45) Date of Patent: May 20, 2014

(54) MICROSTRUCTURED OPTICAL FIBERS AND MANUFACTURING METHODS THEREOF

(75) Inventors: Nasser Peyghambarian, Tucson, AZ (US); Axel Schulzgen, Tucson, AZ (US); Valery Temyanko, Tucson, AZ (US)

(73) Assignee: The Arizona Board of Regents on Behalf of the University of Arizona, Tucson, AZ (US)

( * ) Notice: Subject to any disclaimer, the term of this patent is extended or adjusted under 35 U.S.C. 154(b) by 1447 days.

(21) Appl. No.: 11/913,417

(22) PCT Filed: May 3, 2006

(86) PCT No.: PCT/US2006/016923
§ 371 (c)(1),
(2), (4) Date: Sep. 3, 2008

(87) PCT Pub. No.: WO2006/119334
PCT Pub. Date: Nov. 9, 2006

(65) Prior Publication Data
US 2009/0201953 A1    Aug. 13, 2009

Related U.S. Application Data

(60) Provisional application No. 60/677,069, filed on May 3, 2005, provisional application No. 60/686,864, filed on Jun. 2, 2005, provisional application No. 60/715,536, filed on Sep. 8, 2005.

(51) Int. Cl.
*G02B 6/02* (2006.01)
*C03B 37/02* (2006.01)

(52) U.S. Cl.
USPC .................... 385/123; 65/393; 65/439

(58) Field of Classification Search
USPC .................... 372/6; 385/123; 65/393, 439
See application file for complete search history.

(56) References Cited

U.S. PATENT DOCUMENTS

| | | | |
|---|---|---|---|
| 5,905,745 A * | 5/1999 | Grubb et al. | 372/6 |
| 6,598,428 B1 | 7/2003 | Cryan et al. | |
| 2002/0114607 A1* | 8/2002 | Bagnasco et al. | 385/142 |
| 2005/0069269 A1* | 3/2005 | Libori et al. | 385/125 |
| 2005/0089288 A1* | 4/2005 | Saito | 385/125 |

(Continued)

OTHER PUBLICATIONS

U.S. Appl. No. 12/117,532, filed May 8, 2008, Peyghambarian, et al.

*Primary Examiner* — Queenie Dehghan
(74) *Attorney, Agent, or Firm* — Oblon, Spivak, McClelland, Maier & Neustadt, L.L.P.

(57) ABSTRACT

Optical devices and a method for manufacturing these devices. One optical device includes a core region having a first medium of a first refractive index n1, and includes a cladding region exterior to the core region. The cladding region includes a second medium having a second refractive index n2 higher than the first refractive index n1. The cladding region further includes a third medium having a third refractive index n3 lower than the first refractive index n1. The third medium is dispersed in the second medium to form a plurality of microstructures in the cladding region. Another optical device includes a plurality of core regions including at least one core having a doped first medium, and includes a cladding region exterior to the plurality of core regions. The core regions and the cladding region include a phosphate glass.

20 Claims, 32 Drawing Sheets

(56) References Cited

U.S. PATENT DOCUMENTS

| | | |
|---|---|---|
| 2006/0120677 A1* | 6/2006 | Broeng et al. ............... 385/125 |
| 2006/0263024 A1* | 11/2006 | Dong et al. ............... 385/125 |
| 2007/0002905 A1* | 1/2007 | Budni et al. ............... 372/6 |
| 2009/0067793 A1* | 3/2009 | Bennett et al. ............... 385/125 |

\* cited by examiner

Fig. 6  End and side pumping scheme for short fiber lasers

Fig. 7  Microstructured Fibers

Fig. 8 Illustration-Microstructured Fiber - Fabrication (1) Drawing
(2) Stacking
(3) Re-Drawing Fig. 15 Fabrication: stack-in-tube technique 1 central air hole missing fiber 7 central air holes missing fiber 1-air-hole-missing fiber laser spatial beam quality Fibers drawn with different d/Λ ratios, fiber diameter ~ 125 μm 10 cm long 7-air-hole-missing fiber laser performance Fig. 29  Multiple-Core Fiber With Microstructures Cladding

MICROSTRUCTURED OPTICAL FIBERS AND MANUFACTURING METHODS THEREOF

CROSS REFERENCE TO RELATED APPLICATIONS

This application which is based upon and claims the benefit of priority under 35 U.S.C. §119(e) to U.S. Provisional Applications No. 60/677,069 filed May 3, 2005, No. 60/686,864 filed Jun. 2, 2005; and No. 60/715,536 filed Sep. 8, 2005; the entire contents of which are incorporated herein by reference.

STATEMENT REGARDING FEDERALLY SPONSORED RESEARCH

The present invention was made in part with U.S. Government support under USAF/AFOSR Contract No. F49620-02-1-0380 and National Science Foundation grant DMS-0335101. The U.S. Government may have certain rights to this invention.

DISCUSSION OF THE BACKGROUND

1. Field of the Invention

The invention relates to optical fibers for use in communication networks.

2. Background of the Invention

Optical fibers are used to guide light with extremely small attenuation during propagation. These fibers are typically fabricated using different glasses characterized by low absorption and scattering losses for the wavelength range of the guided light. These fibers consist of a core region to which the light is confined and a cladding region that enables the light confinement. Most applications require fibers that support only the propagation of one fundamental transverse optical mode within the core region. Such fibers are called single mode fibers. Conventional single mode fibers include a step in the refractive index between core and cladding material as illustrated in FIG. 1 that shows the spatial profile of the refractive index. The best-known example of a single mode step index fiber is SMF-28, which was originally developed by Corning and is widely used. In this type of fiber light guiding is based on total internal reflection between core and cladding. To achieve this, the refractive index of the core material $n_{core}$ has to be larger than the refractive index of the cladding material $n_{cladding}$.

In order to achieve single transverse mode guiding in this type of fiber a characteristic fiber parameter; called V number, must satisfy the following criterion:

$$V=(2\pi * r_{core}/\lambda)*[n_{core}^2 - n_{cladding}^2)^{0.5}] < 2.405 \quad (1)$$

where $r_{core}$ is the radius of the core and $\lambda$ the wavelength of light propagating in the fiber. The expression $[(n_{core}^2 - n_{cladding}^2)^{0.5}]$ is called the numerical aperture (NA) of the fiber.

The criterion (1) determines the design of single-mode step index fibers and limits the core size for optical mode propagation. For example, a fiber with $r_{core}$=4 µm has to have an NA smaller than 0.12 in order to become single mode for the optical communications wavelength around 1550 nm. Therefore, if the fiber is made of glass, the refractive index difference between core and cladding glass has to be smaller than $5*10^{-3}$. The technological limit for precise refractive index control of about $10^{-3}$ results in a lower limit for the NA of about 0.06 and, therefore, a maximum core radius of about 20 µm for step index fibers single mode that are single mode at near infrared wavelength.

Numerous articles on the development of optical fibers have been reported such as the following reference articles all of which are incorporated herein by reference:

1) J. M. Jauncy, L. Reekie, J. E. Townsend, and D. N. Payne, Electron. Lett. 24, 24 (1988).
2) G. A. Ball, W. W. Morey, and W. H. Glenn, IEEE Photon. Techn. Lett. 3, 613 (1991).
3) K. Iwatsuki, H. Okamura, and M. Saruwatari, Electron. Lett. 26, 2033 (1990).
4) T. J. Kane and R. L. Byer, Opt. Lett. 10, 65 (1985).
5) M. Sijka, P. Varming, J. Hubner, and M. Kristensen, Electron. Lett. 31, 1445 (1995).
6) Ch. Spiegelberg, J. Geng, Y. Hu, Y. Kaneda, S. Jiang, and N. Peyghambarian, IEEE J. Lightwave Technol. 22, 57 (2004).
7) T. Qiu, A. Schulzgen, L. Li, A. Polynkin, V. L. Temyanko, J. V. Moloney, and N. Peyghambarian, Opt. Lett. 30, 2748 (2005).
8) P. Polynkin, A. Polynkin, M. Mansuripur, J. Moloney, and N. Peyghambarian Opt. Lett. 30, 2745 (2005).
9) P. St. J. Russell, Science 299, 358 (2003).
10) J. Limpert, A. Liem, M. Reich, T. Schreiber, S. Notle, H. Zellner, A. Tunnermann, J. Broeng, A. Petersson, and C. Jakobsen, Opt. Express 12, 1313 (2004).
11) L. Li, A. Schulzgen, V. L. Temyanko, T. Qiu, M. M. Morell, Q. Wang, A. Mafi, J. V. Moloney, and N. Peyghambarian, Opt. Lett. 30, 1141 (2005).
12) L. Li, A. Schulzgen, V. L. Temyanko, S. Sabet, M. M. Morell, H. Li, A. Mafi, J. V. Moloney, and N. Peyghambarian, Opt. Lett. 30, 3275 (2005).
13) L. Li, M. M. Morell, T. Qiu, V. L. Temyanko, A. Schulzgen, A. Mafi, D. Kouznetsov, J. V. Moloney, T. Luo, S. Jiang, and N. Peyghambarian, Appl. Phys. Lett. 85, 2721 (2004).
14) T. Qui, L. Li, A. Schulzgen, V. L. Temyanko, T. Luo, S. Jiang, A. Mafi, J. V. Moloney, and N. Peyghambarian, IEEE Photo. Technol. Lett. 16, 2592 (2004).
15) J. Limpert, N. Deguil-Robin, I. Manek-Honninger, F. Salin, F. Roser, A. Liem, T. Schreiber, S. Nolte, H. Zellmer, A. Tunnermann, J. Broeng, A. Petersson, and C. Jakobsen, Opt. Express 13, 1055 (2005).
16) N. Peyghambarian, T. Qiu, P. Polynkin, A. Schulzgen, L. Li, V. L. Temyanko, M. Mansuripur, and J. V. Moloneym Opt. & Photon. News 12, 41 (2004).
17) C. Spiegelberg, J. Geng, Y. Hu, T. Kaneda, S. Jiang, and N. Peyghambarian, j. Lightwave Tech. 22, 57 (2004).
18) T. Qiu, S. Suzuki, A. Schulzgen, L. Li, A. Polynkin, V. Temyanko, J. V. Moloney, N. Peyghambarian, Opt. Lett. 30, 2748 (2005).
19) J. C. Knight, T. A. Birks, R. F. Cregan, P. St. J. Russell, and J. P. de Sandro, Electron. Lett. 34, 1347 (1998).
20) N. A. Martensen, M. D. Nielsen, J. R. Folkenberg, A. Petersson, and H. R. Simonsen, Opt. Lett. 28, 393 (2003).
21) A. Shirakawa, J. Ota, M. Musha, K. Nakagawa, K. Ueda, J. R. Folkenberg, and J. Broeng, Opt. Express 13, 1221 (2005).
22) B. J. Mangan, J. Arriaga, T. A. Birks, J. C. Knight, and P. S. J. Russell, "Fundamental-mode cutoff in a photonic crystal fiber with a depressed-index core," Opt. Lett. 26, 1469 (2001).
23) L. Li, H. Li, T. Qui, V. L. Temyanki, M. M. Morrell, A. Schulzgen, A. Mafi, J. V. Moloney, and N. Peyghambarian, Opt. Expres 13, 3420 (2005).
24) E. Yahel and A. Hardy, J. Lightwave Technol. 21, 2044-202 (2003).

SUMMARY OF THE INVENTION

One object of the present invention accomplished in various of the embodiments is to provide an optical device and method for making the optical device.

Another object of the present invention accomplished in various of the embodiments is to provide an optical fiber and a method for making the optical fiber.

Yet another object of the present invention accomplished in various of the embodiments is to provide a fiber laser and a method for making the fiber laser.

Various of these and other objects are provided for in certain ones of the embodiments of the present invention.

In one embodiment of the present invention, there is provided a method for manufacturing an optical device that includes providing a plurality of first materials M1 having a first set of characteristic properties providing a plurality of second materials M2 having a second set of characteristic properties different from the first set, making first preforms from materials M1 and M2, drawing the first preforms into a first regular shape to form first unit cells, providing a plurality of third materials M3 having a third set of characteristic properties, providing a plurality of forth materials M4 having a fourth set of characteristic properties different from the third set, making second preforms from materials M3 and M4, the second preforms having an outer shape of the first preforms, drawing the second preforms into the same regular shape and size as the first unit cells to form second unit cells, providing a plurality of fifth materials M5 having a fifth set of characteristic properties, making a tube from M5, forming a stack having a predetermined arrangement from multiple ones of the first and second unit cells, inserting the stack into the tube made from M5 and drawing the stack into a drawn unit that is configured to guide light in at least one region including the material M1.

In one embodiment of the present invention, there is provided an optical device that includes a core region having a first medium of a first refractive index n1 and that includes a cladding region exterior to the core region. The cladding region includes a second medium having a second refractive index n2 higher than the first refractive index n1. The cladding region includes a third medium having a third refractive index n3 lower than the first refractive index n1. The third medium is dispersed in the second medium to form a plurality of microstructures in the cladding region.

In another embodiment of the present invention, there is provided an optical device that includes a plurality of core regions including at least one core having a doped first medium and that includes a cladding region exterior to the plurality of core regions. The core regions and the cladding region include a phosphate glass.

It is to be understood that both the foregoing general description of the invention and the following detailed description are exemplary, but are not restrictive of the invention.

BRIEF DESCRIPTION OF THE DRAWINGS

A more complete appreciation of the present invention and many attendant advantages thereof will be readily obtained as the same becomes better understood by reference to the following detailed description when considered in connection with the accompanying drawings, wherein:

FIG. 10($b$) is a depiction of calculated fundamental mode distributions for MOF7s: $\Delta n = -7 \times 10^{-4}$, $d_{AH}/\Lambda = 0.15$, with (b) four rings of holes;

FIG. 10($c$) is a depiction of calculated fundamental mode distributions for MOF7s: $\Delta n = -7 \times 10^{-4}$, $d_{AH}/\Lambda = 0.15$, with (c) five rings of holes, all three MOF7s have the same (~70%) confinement for the fundamental mode;

FIG. 10($d$) is a depiction a comparison between a MOF7 and a MOF1 with the same core area and demonstrates that the MOF1 demands a much larger physical size;

FIG. 13($b$) is a microscopic image of MOF7 with an OD of 125 μm;

DETAILED DESCRIPTION OF THE INVENTION

For a conventional SM step-index fiber, owing to the achievable precision in refractive-index control, it is extremely difficult to expand the core area beyond 400 μm$^2$ without additional mode-filtering techniques.

Further the development of high power fiber laser is currently an active field of research. However, most high power fiber lasers use silica fibers with lengths of several or several tens of meters. For single frequency operation, these long fiber lasers become an unsuitable player due to difficulties in selecting one frequency from their densely spaced longitudinal modes.

Short fiber lasers with cavity-length of only several centimeters can provide both single transverse mode and single frequency operation.

However, the maximum output power of a cm-long fiber laser is mostly limited to the milliwatt level due to difficulties in increasing ion doping concentrations in the fibers and achieving high pump absorption within a double-cladding-pump scheme. As, the inherent short cavity length and correspondingly small pump absorption typically limits the power of single-frequency Er doped silica fiber lasers to power levels from hundreds of μW to a few mW. These low oscillator powers can be boosted using various power amplification schemes. The higher power, however, has to be paid for by increased noise and broadened laser linewidth, characteristics that are undesirable or even unacceptable in many applications.

The present invention provides a solution to the problem faced by high-power short-length fiber lasers: how to achieve SM operation with a sufficiently large mode area (LMA).

Techniques for making preforms for optical fibers are well known, and include MCVD [modified chemical vapor deposition] (the leading technique for making commercial silica fibers), machining and stacking. MCVD and machining yield one single preform from which the fiber is drawn. Stacking on the other hand implies making a preform from either available or pre-drawn tubes and rods and then drawing the fiber from the resulting stack (PCF).

Figure 1:
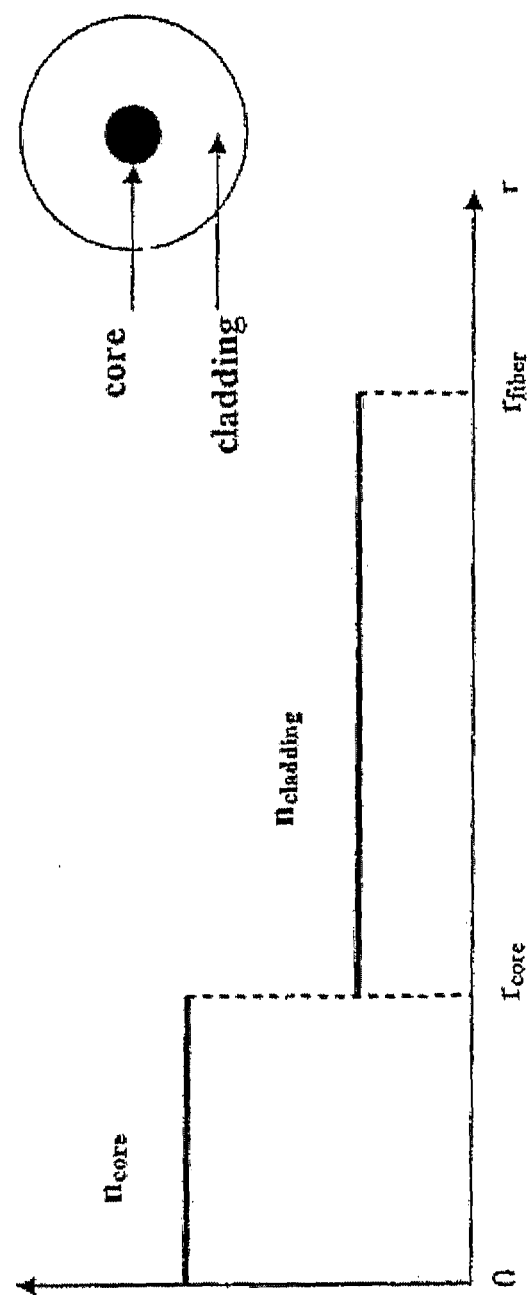
FIG. 1 is a schematic illustration of a refractive index profile of a step index fiber as a function of distance r from the center at r=0.
Figure 2:
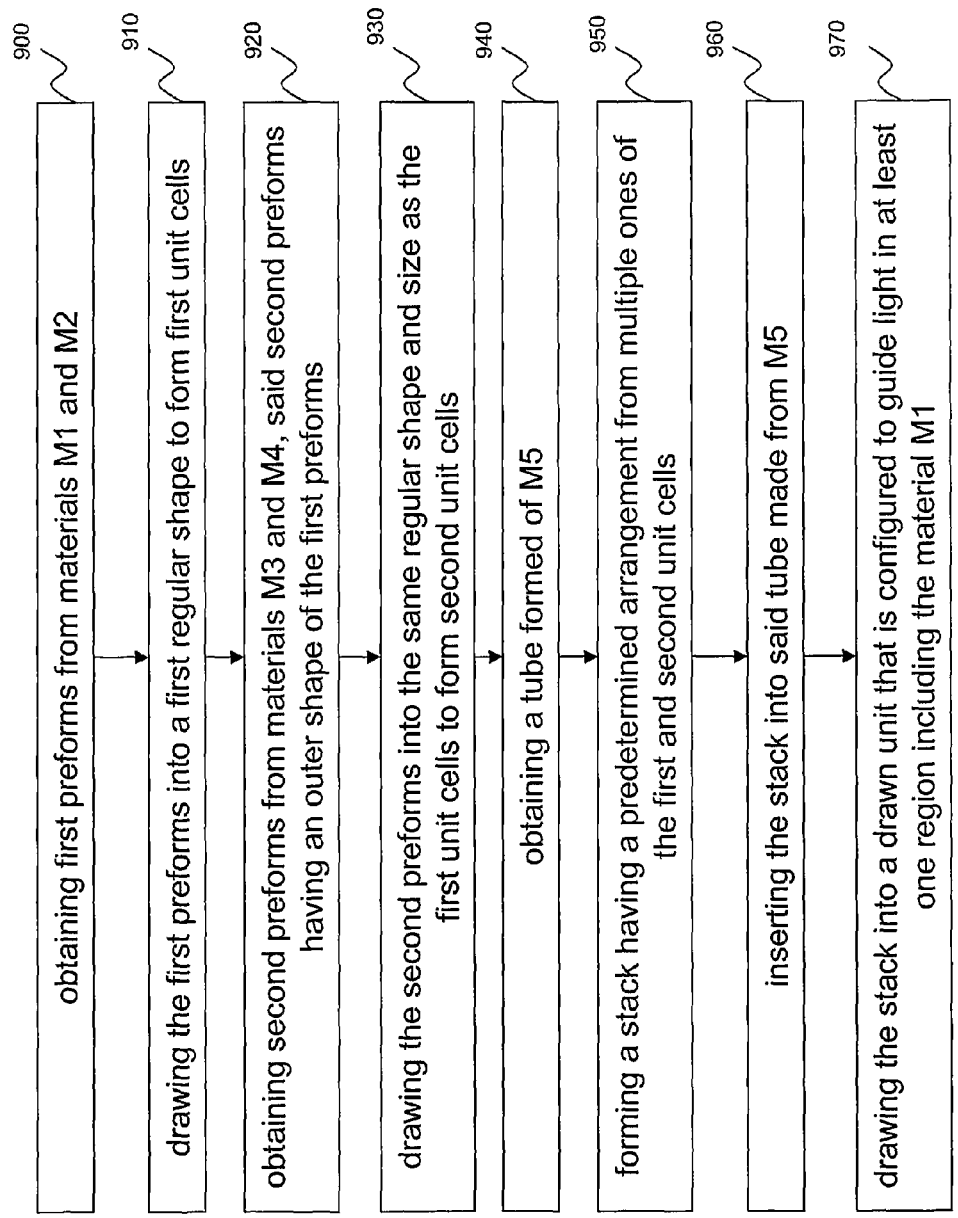
FIG. 2 is a schematic illustration of a general method of manufacturing the optical device.

Referring now to the drawings, wherein like reference numerals designate identical, or corresponding parts throughout the several views, and more particularly to FIG. 2, FIG. 2 is a flowchart depicting one method for manufacturing an optical device, according to the present invention. This method manufactures an optical device formed of a plurality of first materials M1, second materials M2, third materials M3, fourth materials M4, and fifth materials M5 having respective first, second, third, fourth and fifth sets of characteristic properties. The second set of characteristic properties of M2 is different from the first set of characteristic properties of M1, the fourth set of characteristic properties of M4 is different from that of the third set of characteristic properties of M3. At 900, first preforms formed of materials M1 and M2 are obtained and drawn into first unit cells of first regular shape at 910. At 920, second preforms formed of materials M3 and M4 are obtained and second unit cells are drawn into the same regular shape and size as the first unit cells at 930. At 940, a tube formed of M5 is obtained. At 950, a stack having a predetermined arrangement from multiple ones of the first and second unit cells is formed. At 960, the stack is inserted into the tube made from M5. At 970 the stack is drawn into a drawn unit that is configured to guide light in at least one region including the material M1.

Figure 3:
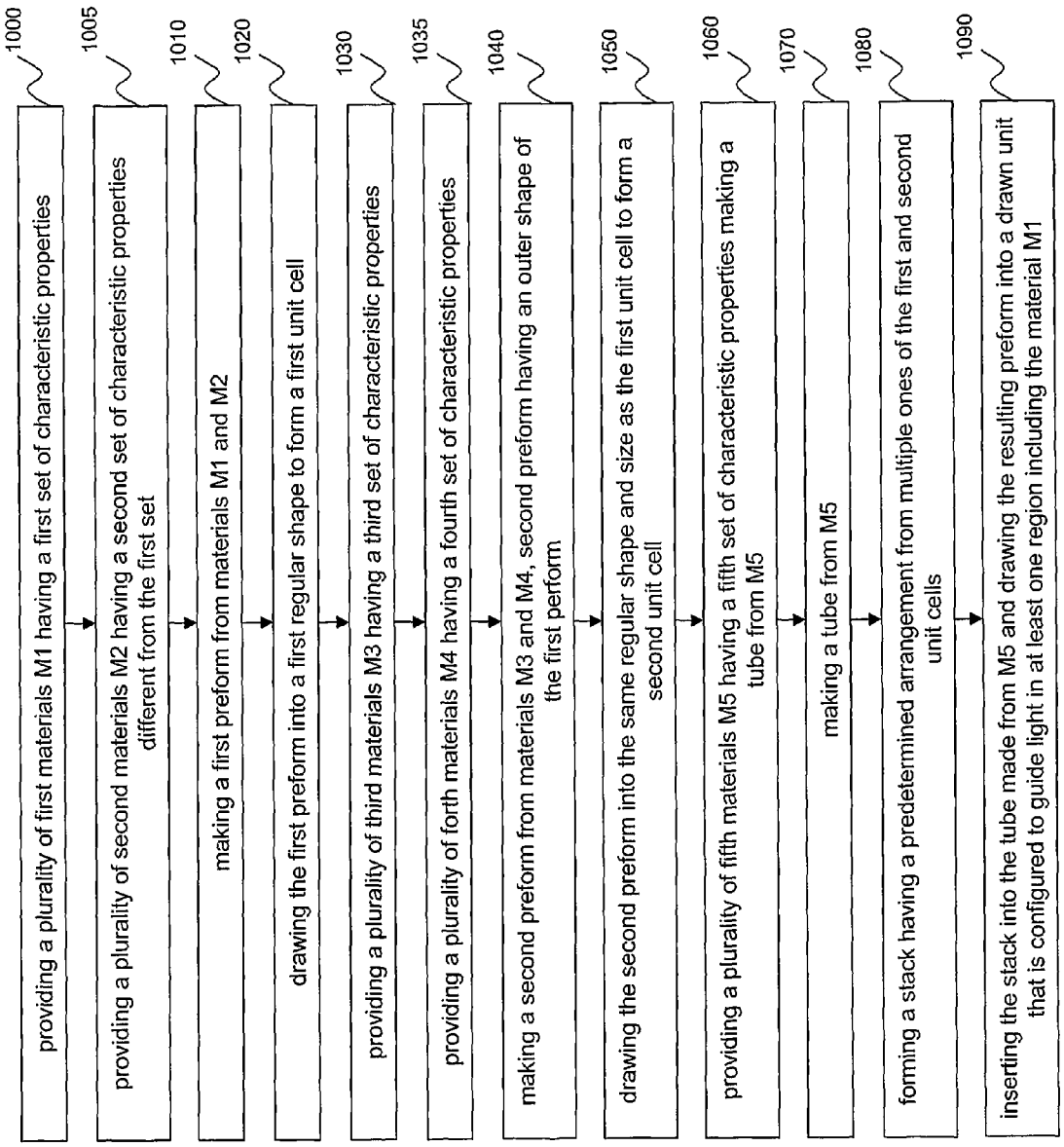
FIG. 3 is a specific illustration of the general method of manufacturing the optical device.

FIG. 3 is a specific illustration of the general method of manufacturing the optical device; At 1000, a plurality of first materials M1 having a first set of characteristic properties are provided. At 1005, a plurality of a plurality of second materials M2 having a second set of characteristic properties different from the first set are provided. At 1010, first preforms from materials M1 and M2 are made. At 1020, the first preforms are drawn into a first regular shape to form a first unit cell. At 1030, a plurality of third materials M3 having a third set of characteristic properties are provided. At 1035, a plurality of forth materials M4 having a fourth set of characteristic properties are provided. At 1040, second preforms from materials M3 and M4 are made, the second preform having an outer shape of the first preform are made. At 1050, the second preforms are drawn into the same regular shape and size as the first unit cell to form a second unit cell. At 1060, a plurality of fifth materials M5 having a fifth set of characteristic properties making a tube from M5 are provided. At 1070, a tube is made from M5. At 1080, a stack having a predetermined arrangement from multiple ones of the first and second unit cells is formed. At 1090, the stack is inserted into the tube made from M5 and the resultant preform is drawn into a drawn unit that is configured to guide light in at least one region including the material M1. Characteristic properties of M1, M2, M3, M4 and M5 include density, refractive index, glass transition and melting temperature, and coefficient of thermal expansion.

Furthermore, if the third material in the preform is air resulting in through holes once the stack is drawn, the through holes can be filled with a material of a third refractive index. At 1020 and 1030, the glass forms can be drawn into regular shapes such as hexagonally shaped preforms. At 1040, stacking the first and second glass forms can result in a periodic arrangement of the third material in any region of the stack. The stacking at 1040 can result in the placement of a solid glass form (doped or undoped) in a center of the stack to form therefrom a solid core in the drawn stack.

In one embodiment of the present invention, the placement of the first and second glass forms in the stack in a predetermined order forms from the drawn stack a stepped refractive index structure.

Moreover, in one embodiment of the present invention, the method forms reflection coatings on ends of the drawn stack, and in another embodiment forms a trench in a substrate and disposed the drawn stack in the trench.

Figure 4:
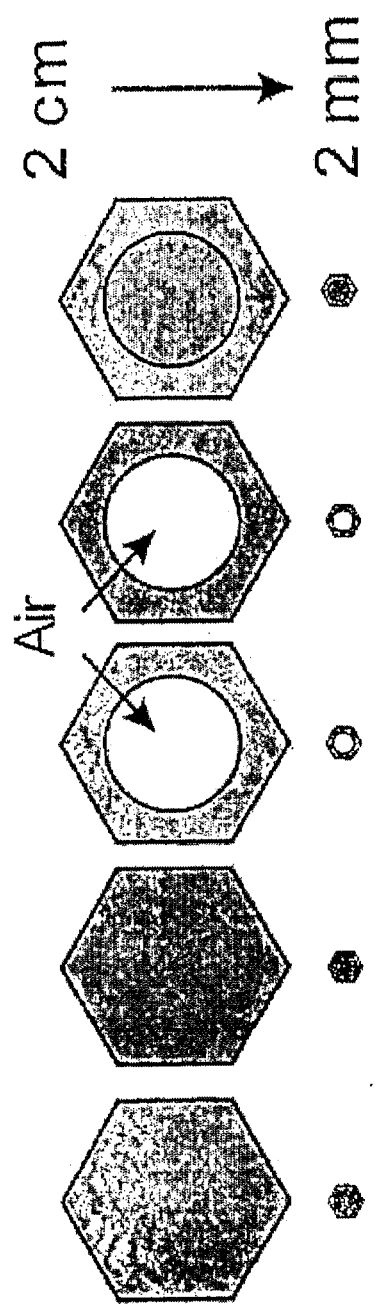
FIG. 4 is a schematic illustration of an example of five types of First Generation Preforms.
Figure 5:
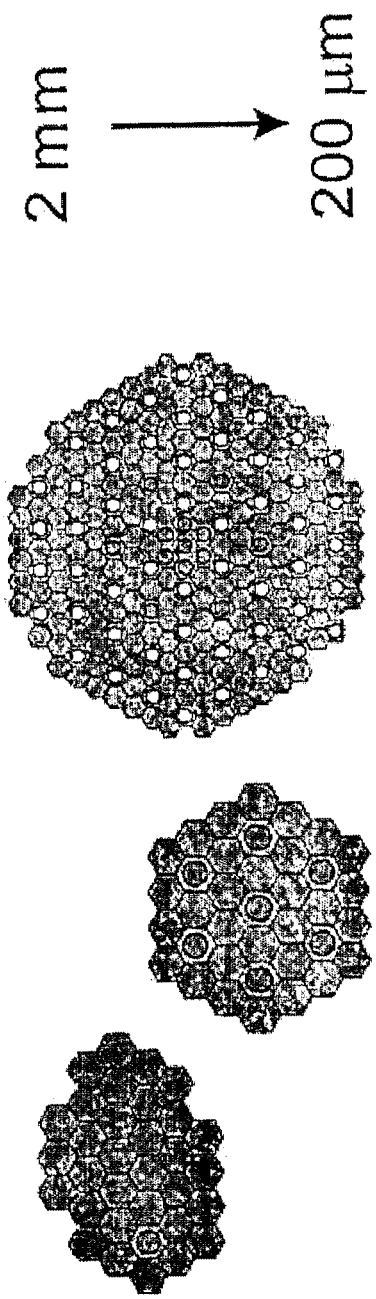
FIG. 5 is a schematic illustration of an example of variety of second generation preforms and fibers.

The present embodiment provides the ability to produce fibers of any geometry with any number of cores and air holes, as well as their arbitrary positions. To accomplish this aspect of the present invention, two types of glass are used: doped and undoped. Then five different types of preforms (FIG. 4) are made and drawn for example into 0.7-2 mm fibers. These fibers, which are for example hexagonal in shape, serve as building blocks for the final preform. The various configurations for the final preform (FIG. 5) include but are not limited to symmetric and asymmetric cladding shapes, single and multiple core arrangements, photonic crystal structures with a periodic air hole arrangement perpendicular to the fiber drawing direction, and any combination of the above such as photonic crystal structures with multiple cores. This approach of one embodiment of the present invention provides virtually limitless flexibility in the structure of the fibers that are drawn from these preforms, thus facilitating production of fibers with properties unachievable before the present invention. The impact and advantages of the novel approach of the present embodiment to single mode PCF's are abundant. It becomes possible to fully utilize existing technologies, e.g. MSVD or batch glass, for making both passive and active single mode fibers with large mode diameters. So far about 600 $\mu m^2$ mode area has been demonstrated, but this is by no means a limit and mode sizes well beyond those achievable with traditional step index fibers are possible. The novel large mode area, single mode fiber design of the present invention is particularly useful for the generation, amplification, and transmission of high power single mode lasers since an increase in the transverse optical mode size reduces undesirable nonlinear effects. An improved stability of the beam quality for fibers made with this novel negative index step design is found when compared to conventional index matching photonic crystal fibers.

As discussed above, in one embodiment the design of short-length, high-power fiber lasers calls for single-mode large-mode-area (LMA) optical fibers incorporating a highly doped active core area. In LMA fibers, nonlinear effects are reduced since they scale with light intensity and interaction length. Furthermore, the power generated per length is larger due to an increase in the volume of the active gain medium afforded by the present invention.

In one embodiment of the present invention, microstructured fibers made of phosphate glass are realized. Utilizing holey fibers with relatively high levels of Er/Yb co-doping in the core region ($1.1 \times 10^{26}$ $Era^{3+}$ ions/m$^3$ and $2.2 \times 10^{26}$ $Yb^{3+}$ ions/m$^3$) more than 3 W of output power is obtained from the 10 cm long fiber lasers. This result demonstrates the suitability of the novel stack-and-pull fabrication technique as well as the quality of the microstructured fibers and shows that single-mode fiber lasers support large mode areas.

The design of the microstructured fibers of the present invention is based in part on the concept of an effective index. Guidance through a periodic triangular array of air-holes with diameter d and pitch Λ that forms the inner fiber cladding. The core is formed by a number of unit cells made of solid doped glass in the center of the stacking structure. The transverse mode structures of different fibers with active core areas between 60 $\mu m^2$ and more than 1100 $\mu m^2$ create important design parameters for LMA single-mode operation that can provide mode sizes well beyond those achievable with traditional step index fibers.

The phosphate glasses used for fiber fabrication has a high solubility of rare-earth ions and low clustering effects, which allows an increase in the concentration of $Er^{3+}$ ($1.1 \times 10^{26}$ ions/m$^3$) and $Yb^{3+}$ ($8.6 \times 10^{26}$ ions/m$^3$) ions without enhancing the detrimental quenching processes. The fiber has a D-shaped clad and an off-center circular core to achieve the so-called "chaotic propagation" of the pump which improves the pump absorption. The core diameters and numerical apertures of multi-mode and single-mode fiber lasers are 19 m, 13.5 m, 0.17, and 0.07, respectively. The fibers have an inner clad diameter of 125-130 m. fibers with length of 7 cm were used for both single-mode and multi-mode fiber lasers. The fiber laser cavities are formed by dielectric coatings at the fiber ends and an output coupler or by using fiber gratings. Up to 9.3 W of power is obtained from the multi-mode fiber laser with $M^2 < 3.5$ and 4.0 W from the single-mode fiber laser with $M^2 < 1.2$. These are the highest powers ever generated from multi-mode and single-mode fiber lasers with fiber lengths smaller than 10 centimeters.

In addition, microstructured fiber lasers are fabricated with variable core sizes ranging from 9 μm to 32 μm using the stack and draw technique discussed above. These novel fiber lasers show more than 3 Watts of output power from 10 cm long fiber lasers.

By using these techniques the present invention can boost the power from cm-long fiber lasers by more than one order of magnitude from conventional techniques.

Figure 7:
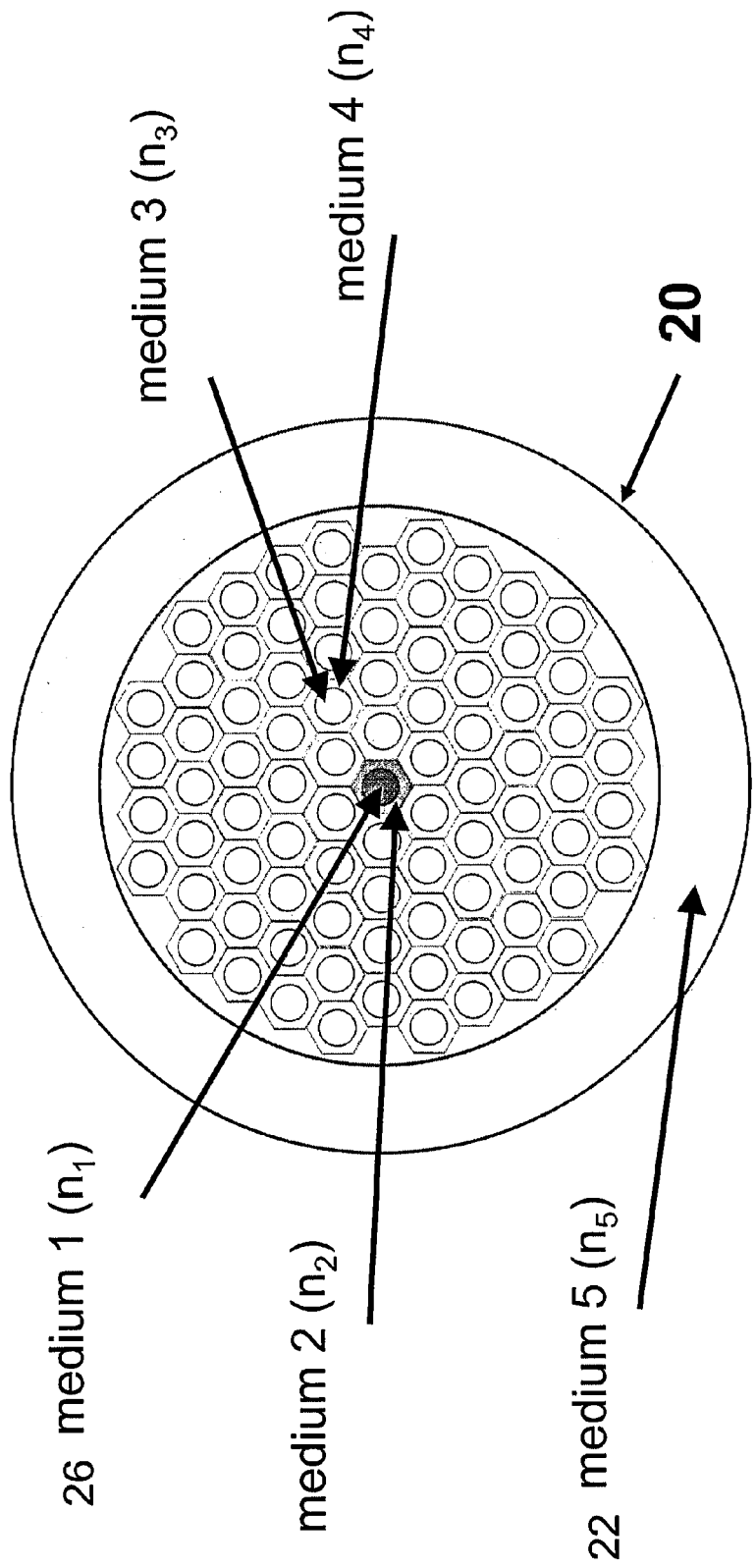
FIG. 7 is a schematic illustration of a typical cross section of a microstructured fiber.

FIG. 7 depicts a typical structure of single mode microstructured fiber.

The region with the first medium M1 surrounded by the second medium M2 serves as the light guiding core. FIG. 7 is a schematic illustration of one embodiment of the present invention in which an optical device 20 includes a core region including a first medium having a predetermined refractive index $n_1$. As shown in FIG. 7, in the present invention, there is an inner cladding region surrounding the core region that includes 1) a third medium with a refractive index $n_3$ and 2) a fourth medium having a characteristic refractive index $n_4$. The third medium is dispersed in the fourth medium to form a plurality of microstructures in the inner cladding region, as illustrated for example in FIG. 7. The inner cladding is surrounded by an outer cladding that includes a fifth medium with refractive index $n_5$.

In one embodiment of the present invention, the outer cladding region 22 and the central region 26 are part of an optical fiber for transmission of light along a length of the fiber. As to be discussed later, the numerical aperture and transmission properties of such a fiber are improved over conventional clad fibers in which the inner cladding material in conventional optical fibers has a lower index of refraction than the core medium to permit transmission in the core via total internal reflection. Indeed, the transmission characteristics of the optical fiber of the present invention are improved when the inner cladding medium 4 has a higher index of refraction than the core medium 1 and a plurality of microstructures including media 3 and 4 are arranged as a periodic array, such as for example the triangular array shown in FIG. 7 other suitable array patterns are circular, square, and rectangular arrays).

Suitable materials for the cladding region 22 include silicate, phosphate, chalcogenide or fluoride glasses. Suitable materials for the central region include silicate, phosphate, chalcogenide or fluoride glasses. In various embodiments of the present invention, the optical fiber of the present invention has a core area greater than 200 µm$^2$ and in theory there is no upper limit to the core area.

In one embodiment of the present invention, the plurality of microstructures can consist of unit cells where the holes in medium 4 are filled with a dielectric medium 3 having a refractive index less than 2.0, such as for example a polymer, liquid or gas.

In one embodiment of the present invention, the refractive index of the fourth medium is greater than the refractive index of the first medium. Further, in one embodiment, the inner cladding region and the central region 26 can be formed to have a stepped refractive index structure in which inner cladding region and the central region 26 have different refractive indices across a boundary between the two. For example, the medium 4 and the medium 1 in the central region 26 can be formed to have a negative index change $(n_1-n_4)$ of $-1\times10^{-4}$, $-7\times10^{-4}$, or $-14\times10^{-4}$ (for example in a range from $10^{-3}$ to $10^{-4}$) achieved by a variation of the refractive index in the first medium or a variation of the refractive index in the fourth medium.

Figure 8:
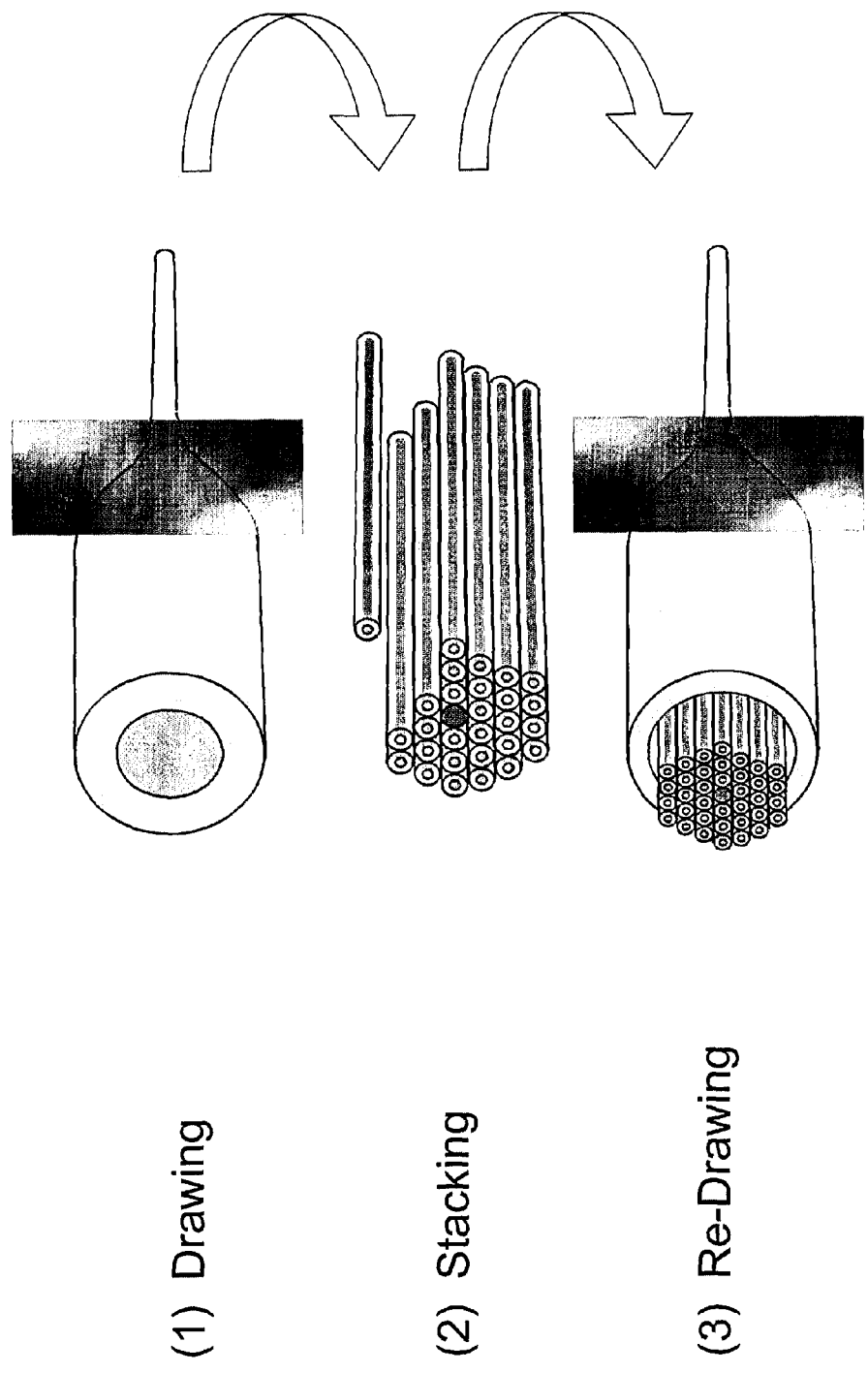
FIG. 8 is an illustration of the fabrication process for a microstructured fiber according to the present invention.

In one embodiment of the present invention, as shown in FIG. 8, the central region can be formed of a solid core 26 surrounded by the plurality of microstructures. This embodiment is particularly appropriate for use in optical fiber amplifier and fiber lasers where the central region can be doped to absorb light and enable stimulated emission. Accordingly, the central region 26 by way of the first or the second medium would include an absorption medium having a dopant configured to absorb incident radiation and generate photons through emission from excited ions. Dopants such as Er, Yb, Nd, Ho, and Pr, or metals such as Fe and Cr are used at concentrations of at least $10^{20}$ cm$^3$, other suitable dopants include all rare-earth elements, in addition to the list above. The ion concentrations of the present invention range, for example, from $10^{20}$ to $10^{21}$.

Figure 6:
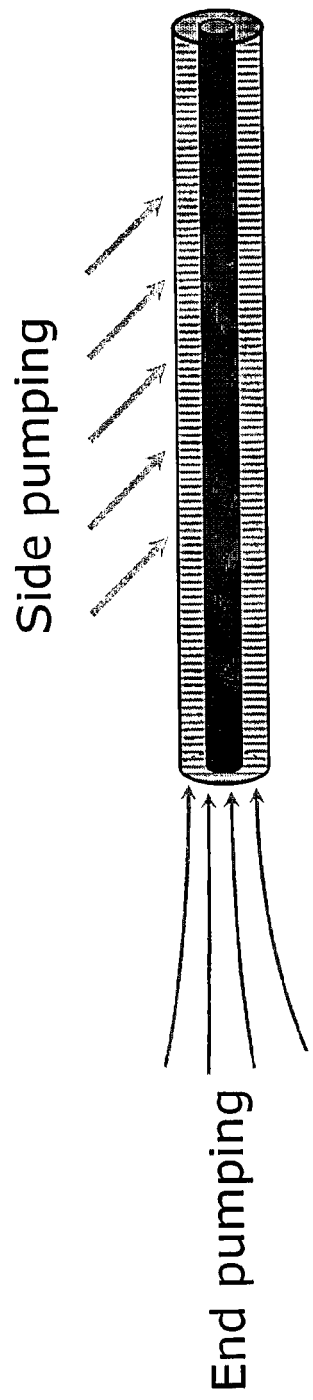
FIG. 6 is a schematic illustration of end and side pumping schemes for fiber lasers.
Figure 9:
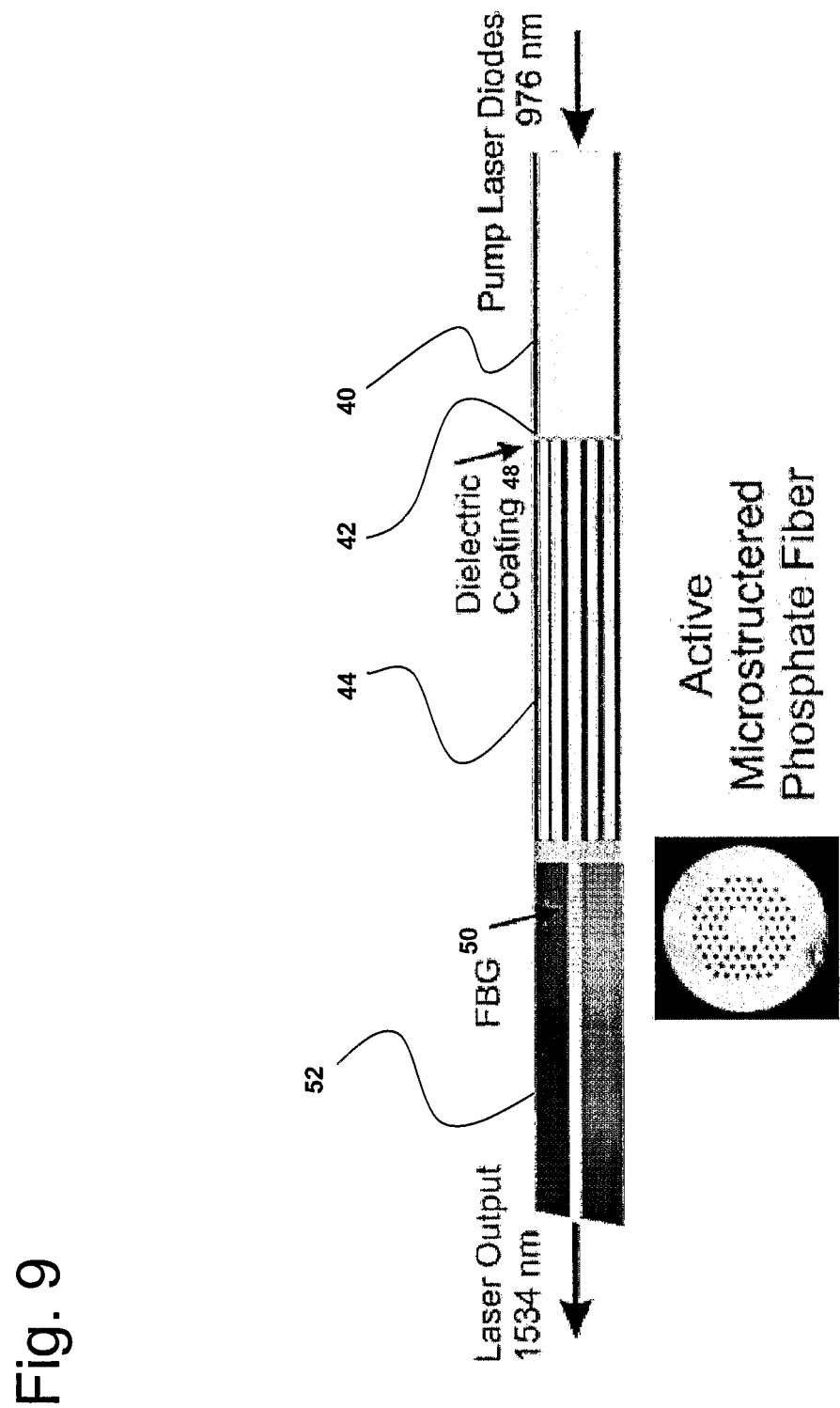
FIG. 9 is a schematic of the single-frequency fiber laser and a microscope image of the active photonic crystal fiber with 125 microns outer diameter is shown in the lower left part.

In one embodiment of the present invention, as shown in FIG. 9, there is included an optical pumping device 40 that optically excites through an end 42 of the active optical laser 44 (see FIG. 9) or that optically excites through a longitudinal side of the active optical fiber 44 (see FIG. 6, illustrating end and side pumping configurations).

In general, two processes determine the pumping efficiency: The first is the absorption of the pump light in the doped fiber itself, with a rate depending mainly on the concentration of the dopant in the core glass material of the active fiber as well as the geometry of the fiber cross section. The second process is the evanescent-field cladding-to-cladding coupling between the coreless delivery fibers and the active fiber. The rate of the latter is roughly proportional to the ratio of the numerical aperture (NA) of the pump lightwave in the coreless delivery fiber to the fiber diameter. This ratio approximately equals the number of reflections at the interface between the fibers per unit length, experienced by the guided pump beam as it propagates in the delivery fiber. Therefore, to maximize the pump absorption in the active fiber, one should decrease the diameter of the delivery fibers and also inject the pump light into the delivery fibers in such a way as to excite high-NA spatial modes. To gain a qualitative understanding of the dependence of the evanescent-field coupling strength on the NA of the guided pump light, a simple experiment was conducted. Two identical passive single-mode silica fibers with the cladding diameter of 125 µm were held together with the PTFE tube over a fixed length of 9.5 cm. The free-space collimated pump light is coupled into the cladding of one of the fibers with objective lenses of different NA. The measured power splitting ratio at the output of this multimode two-by-two combiner as a function of the NA was determined, together with a linear fit. The splitting ratio for this particular combiner length was about one fifth of its maximum value of one, if the NA of the coupling lens was 0.2, a typical value for the multimode fiber used for pigtailing pump laser diodes. The splitting ratio grew approximately in proportion with the NA of the guided lightwave in the input fiber. Since total internal reflection of the pump light at the interface between the silica fibers and the PTFE tube occurs for NA<0.53, this value should not be exceeded in designing a practical device, to prevent rapid loss of the pump light into the heat-shrink tube. Using a similar setup, the effective length of evanescent coupling was further measured for the case of two identical silica fibers and two high-NA coupling lenses. The output coupling ratio was separately measured for five combiners of different length. Assuming that the coupling along the combiner is proportional to the intensity difference between the two fibers, with a proportionality constant equal to the inverse of the effective coupling length, the coupling length can be estimated as 10 cm. In reality, the coupling between silica delivery fibers and low-melting temperature doped fiber can be somewhat higher because of the negative difference between the refractive indexes for the two materials (The indexes are 1.45 and 1.55 for silica and a typical phosphate glass, respectively.) In addition, the pump coupling can be enhanced by using pump delivery fibers of smaller size than that of the active fiber. To excite the high-NA spatial modes in the pump delivery fibers, the multimode fiber pigtails from the pump laser diodes can be tapered and spliced to the delivery fibers. Since the pigtails and the pump delivery fibers are made of silica, both tapering and splicing are straightforward with standard fusion splicing equipment. The highest degree of tapering is determined by the ratio of the maximum "safe" NA of 0.53, to that of the pigtails. Typically, high-power pump laser diodes are pigtailed with a multimode silica fiber with NA=~0.2, which determines the optimum tapering ratio to be ~2.5.

It is important to point out that the above-described dependence of the pump coupling efficiency on the NA of the pump light in the delivery fibers, as well as the pump intensity distribution between the fibers along the bundle, have to be understood as only qualitative design guidelines. These measurements basically show that a substantial fraction of the pump light can be coupled into the active fiber in the 10-cm-long structure, and that the coupling can be considerably enhanced by modifying the modal content of the pump light in the delivery fibers. Both pump coupling between the fibers and its absorption in the active fiber will vary along the interaction region, because the high-order spatial modes in the pump delivery fibers are transferred into the active fiber first and the low-order modes last, and the pump absorption in the active fiber core is different for modes of different geometry.

Further, as illustrated in FIG. 9, reflection coatings 48 are applied to ends of the active optical fiber 44. The reflection coatings 42 transmit pumping light and partially reflect laser light generated in the active optical fiber 44 so as to form a laser cavity along the length of the active fiber 44. Further, as illustrated in FIG. 9, a diffraction grating 50 can be placed in a fiber 52 to form the output coupler of the laser cavity.

While the scalability of the mode area using conventional single mode step index fibers is limited to about 400 µm$^2$ due to finite precision in refractive index control, this new class of single mode microstructured fibers, also called holey fibers or photonic crystal fibers (PCF), has shown the potential to fabricate superior large mode area fibers because of their endlessly single-mode properties combined with (in principle) unlimited, large effective mode areas. The design of the microstructured fibers of this embodiment is based on the concept of effective index guidance through a periodic triangular array of air-holes with diameter d and pitch Λ that forms the fiber cladding.

In order to achieve single mode guidance a PCF should satisfy a condition similar to (1) shown above:

$$V=2\pi*\Lambda/\lambda)*[(n_{FM}^2(\lambda)-n_{SFM}^2(\lambda))^{0.5}]<\pi \quad (2)$$

where $n_{FM}(\lambda)$ is the wavelength dependent effective index of the fundamental mode and n SFM (λ) is the corresponding index of the first cladding mode, also called fundamental space filling mode. Both of these indices are calculated using Maxwell's equations and their wavelength dependence results in a spectral dependence of the V number that is very different from that of step index fibers. Previous work has shown single mode fibers with effective mode areas larger than 1000 μm².

So far PCF's fabricated from one material have been discussed. This concept is generally used in passive fibers where the solid core is generally made from the same glass material used for the photonic crystal cladding with air holes. On the other hand, active fibers require that a doped glass is used to form the core region as illustrated in FIG. 8. This doping leads to an increase of the refractive index in the core region that can be compensated by co-doping, e.g., with fluorine. Conventionally, attention has been focused on achieving a close matching between core and cladding index to a level of about $10^{-5}$ in order to provide structural instead of index step guiding while retaining single mode operation at the desired wavelength. This approach is referenced to here as index matching PCF's.

In this embodiment, the present invention provides a novel approach to fabricate active and passive single mode microstructured fibers. Instead of trying to closely match the refractive indexes of glasses in the core and cladding region, the present invention uses glasses with a lower refractive index in the core region. This approach utilizes the flexibility of the stack-and-draw technique to significantly lower control and fabrication tolerances compared to index matching PCF's.

Glass with of up to $5\times10^{-3}$ smaller refractive index is used in the core region compared the index of the glass in the cladding region. In the absence of the air holes such fiber structure would correspond to a step index fiber with an anti-guiding core that does not support any low loss light propagation inside the core region. However, in the presence of air holes, the unique properties of the PCF allow for the light propagation in the fiber core even if the index of the glass it is made of is smaller than that of the index of the glass in the surrounding cladding region. The exact guiding properties of such a PCF depend on structural details of the fiber in particular on the distance between air holes, i.e. the pitch Λ, and the air hole diameters d. With the negative index step approach of the present invention, single mode fibers of a wide variety can be designed that range from structures with "one air hole missing" cores to "multiple air hole missing" cores and also include multiple core fibers and polarization maintaining PCF's.

Microstructured optical fibers (MOFs), with high-index solid cores surrounded by patterned claddings, are attractive for interesting applications such as high-power fiber lasers. The cores of MOFs are formed by filling (missing) one or multiple air holes in the otherwise periodic air hole structure. Endless single-mode (SM) core guidance has been observed in MOFs whose cores are formed by filling one air hole, while SM operations have been realized on MOFs with extended core areas, e.g., cores formed by filling three or seven air holes. The endless property is illustrated in that single mode guidance for every wavelength of light inside the fiber is achieved. In contrast, conventional fibers have a cut-off wavelength.

Figure 10:
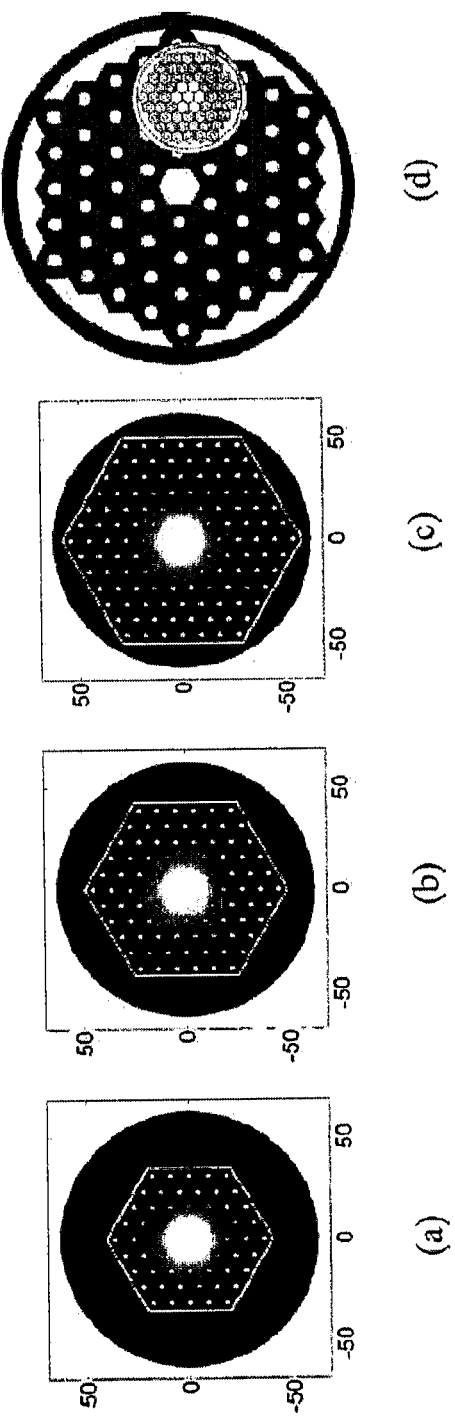
FIG. 10($a$) is a depiction of calculated fundamental mode distributions for MOF7s: $\Delta n = -7 \times 10^{-4}$, $d_{AH}/\Lambda = 0.15$, with (a) three rings of holes.

The seven-missing-hole MOF (MOF7) effectively provides large-mode-area (LMA) SM guidance that usually cannot be achieved by step-index fibers (SIFs); at the same time, only a small number of air hole shells are necessary to confine the modes. It can be seen that otherwise identical MOF7s with 3, 4, and 5 rings of holes have almost identical fundamental mode distributions, as shown in FIGS. 10(a)-10(c), respectively. The outer diameter (OD) of the LMA MOF7 can thus be kept compatible with commercial fibers (125 μm OD); in comparison, to obtain a similar core area and modal confinement, a one-missing-hole MOF (MOF1) needs to expand its OD almost three times, as shown in FIG. 10(d). This requirement results in increased material cost and physical incompatibility with commercial fibers; e.g., the mismatch of fiber sizes increases loss for fusion splicing. Additionally, it is important that the holes be in a periodic arrangement.

A default assumption for fabrication and analysis of SM MOF is zero index difference ($\Delta n=n_{core}-n_{clad}$) between the core material index ($n_{core}$) and the cladding material index ($n_{clad}$), which is naturally satisfied by passive MOFs made entirely from the same material. However, for active MOFs with doped cores, this condition requires attention. The addition of active ions inevitably changes $n_{core}$, and other dopants can, in principle, be added to tailor both $n_{core}$ and $n_{clad}$. Although this index tailoring poses a fabrication challenge, it also adds flexibility to the fiber design. While several $Yb^{3+}$-doped silica LMA MOFs have been reported under SM operation with slightly positive Δn, there is a lack of systematic study on how Δn influences the MOF's modal property [12]. Typically where Δn is negative (core index is depressed, $n_{core}<n_{clad}$) antiguiding for SIFs results, however stable guidance and SM lasing are possible for MOFs owing to the existence of the air holes, which effectively suppresses $n_{clad}$.

This embodiment describes how negative core-cladding Δn affects the modal property of MOF. In the present embodiment, MOFs are fabricated with various Δn and structural parameters and their modal behavior is determined. SM operation is achieved for MOFs with the proper choice of Δn and structure. Beam qualities of guiding modes of different orders are also calculated and the effective V parameter ($V_{eff}$) is extended in the calculation to MOF7. This embodiment used phosphate MOFs with $Er^{3+}$—$Yb^{3+}$-codoped cores; however, the results can be applied to fibers of any host glass. By depressing the core index, the technical difficulty in pursuing extremely small Δn for LMA MOFs can be waived, resulting in relaxed tolerance and more flexibility in fiber design and fabrication.

Additionally, active MOFs have been extensively utilized for fiber amplifiers and lasers, e.g., $Yb^{3+}$-doped silica MOF at ~1.1 μm and $Er^{3+}$—$Yb^{3+}$-codoped phosphate MOF[6] at ~1.5 m. A $Yb^{3+}$-doped MOF7 with a SM core area of ~$10^3$ m² have been reported, with a small positive Δn (~$10^{-5}$). However, with such a superior index control technique, there does not seem to be an advantage of using a MOF design: a step index fiber (SIF) with the same Δn can have a SM core area as large as ~$1.5\times10^4$ m². In order to take full advantage of MOF's unique modal properties and relax the tight tolerance in index control, an alternative approach of introducing a negative Δn is taken. The core index is depressed so that the MOF core will be leaky until the holes in the cladding open up to a certain size, and the modal quality is controlled by properly choosing Δn and air hole size.

In one embodiment of the present invention, MOFs are made of phosphate glasses, and are used to fabricate short-length MOF lasers. The MOFs have a 125 µm OD, a 9 µm pitch Λ (air hole pattern periodicity), an active core area of ~430 µm², but have various $d_{AH}$. It has been well known that the MOF modal properties are decided by two relative ratios, Λ/λ and $d_{AH}$/Λ. In the present case, Λ/λ is fixed and the effect of $d_{AH}$/Λ is considered. The MOFs are drawn with various $d_{AH}$, starting with no holes ($d_{AH}$=0) to maximal holes ($d_{AH}$=0.5Λ). The MOF cores in this example were doped with 1 wt. % $Er_2O_3$ and 2 wt. % $Yb_2O_3$ and other co-dopants were added to selectively tailor the negative Δn. Three Δn values are introduced: $-15\times10^{-4}$, $-7\times10^{-4}$, and $-5\times10^{-4}<\Delta n<0$, respectively. The glass indices are measured with a prism coupler.

In one embodiment of the present invention, short-fiber lasers operating at 1.5 µm were made from seven-missing-hole MOF (MOF7), which are ~11 cm long fiber with both ends cleaved. One advantage of utilizing such short MOFs is that the fiber bend loss is no longer a concern. Bend loss has to be considered when long fiber is coiled for SM operation; however, the MOF in the present embodiment is designed for short-length applications, and SM operation is achieved by tailoring the fiber design. Since the MOF is used in the straight form, the bend loss can be ignored. The short fiber lasers are end pumped with 975 nm pump light launched into the MOF cladding by a multimode fiber, whose facet is coated with dielectric layers. The pump fiber is butt coupled to one end of the MOF, and the coating serves as the high reflector (at 1.5 m) of the laser cavity. A beam profiler is used to measure the $M^2$ value of the output beam exiting the other MOF end. The $M^2$ values, all taken under ~3.5 W pump power, are plotted versus $d_{AH}$/Λ in FIG. 2. MOF7s with three Δn values are compared in FIG. 11.

Figure 11:
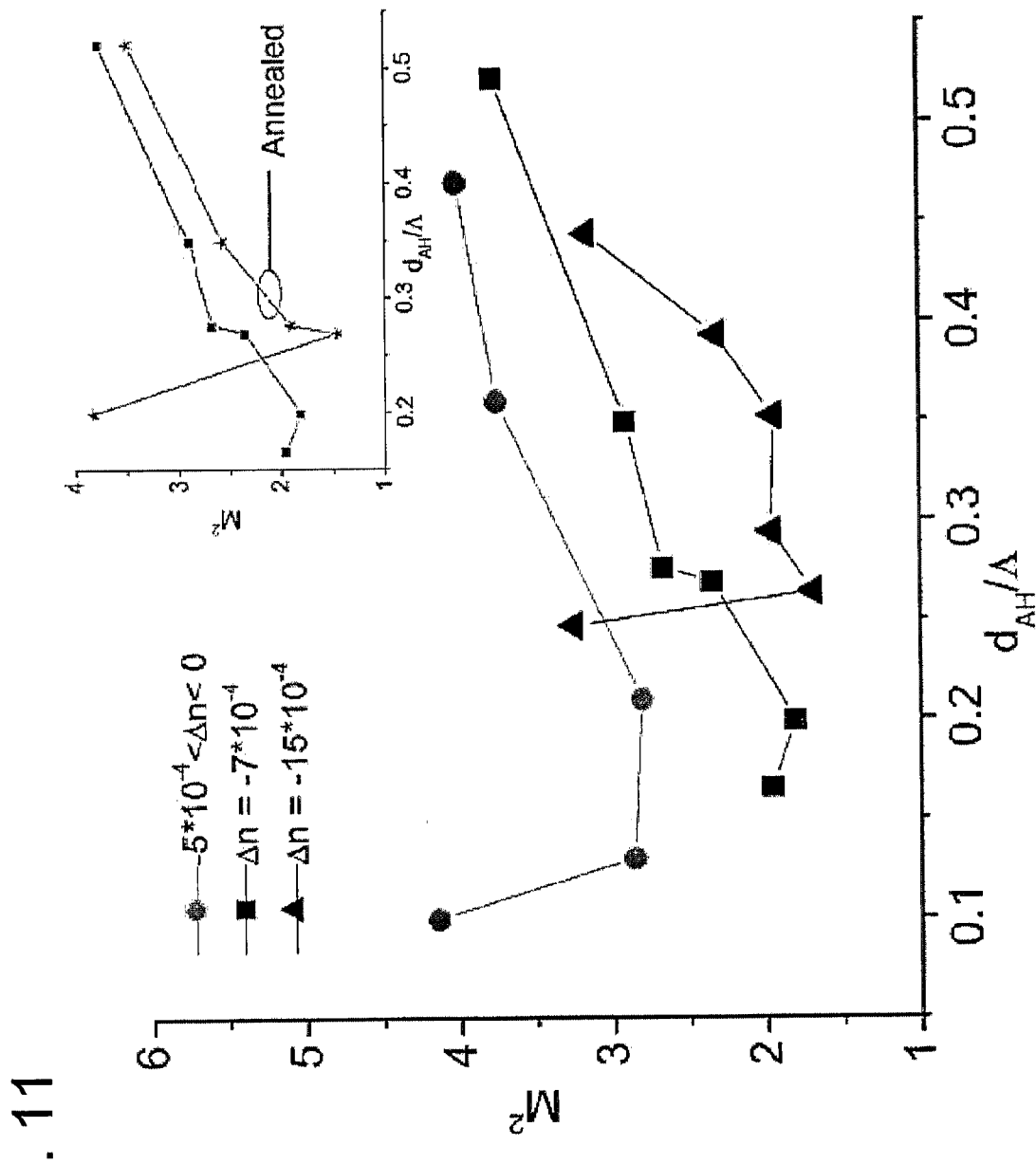
FIG. 11 is a graph of measured $M^2$ values versus $d_{AH}/\Lambda$ of MOF7s with three $\Delta n$ values, inset, effect of annealing on MOF7s initially having $\Delta n = -7 \times 10^{-4}$.

FIG. 11 shows that all three $M^2$ curves have similar shapes: the curves start with relatively large $M^2$ values at small holes, followed by a sharp drop to a minimum, then increase again, gradually. The anti-guiding behavior with small holes confirms that the MOFs have depressed-index cores. SM laser operation begins when $d_{AH}$/Λ reaches a threshold, and it is a sudden transition from anti-guiding to SM guiding, as shown by the steep $M^2$ drops. The threshold is decided by Δn: the larger |Δn|, the higher the threshold. Thus, the leftmost curve represents MOFs with a minimal Δn, and the rightmost has the largest Δn ($-15\times10^{-4}$). Fundamental mode operation is confirmed by observation of the far-field pattern, though the best $M^2$ value measured is 1.7, not diffraction limited. The higher $M^2$ value has two reasons: first, the MOF's fundamental mode shape deviates from a Gaussian models; second, the MOF has high internal stress originating from its stack-and-draw fabrication process, which may deteriorate the modal quality. A fine annealing process is performed on the MOF7 with Δn=$-7\times10^{-4}$ to release the stress, and as a result the best $M^2$ value drops to <1.5 (inset of FIG. 11). Annealing also changes Δn, as the annealed $M^2$ curve is shifted to the right and the annealed fibers become leaky with small holes. Passing the SM regime, high-order modes sequentially appear as $d_{AH}$/Λ increases, and the beam quality deteriorates gradually with increasing $M^2$ values.

Additionally, a finite-element method model has been used to calculate the MOF's modal behavior. As an example, the calculated modal qualities ($M^2$ values) of a MOF7 with Δn=$-7\times10^{-4}$ are plotted in lower FIG. 12, along with the measured values. The simulation showed that, while the fundamental mode always provides high-quality beams with $M^2<2$, the modal quality rapidly deteriorates for high-order modes. It is thus important to find the modal cutoff of MOF7. $V_{eff}$ can be defined for MOF, equivalent to the V parameter for SIF:

$$V_{eff} = \frac{2\pi R}{\lambda} \sqrt{n_{core}^2 - n_{FSM}^2}, \quad (1)$$

where $n_{FSM}$ is the effective index of the fundamental space-filling mode and R is the core radius that has been defined differently for MOF1. R is the radius of the fundamental mode that is guided in the core. The bigger this radius, the more optical gain can be achieved by overlap of the fiber node with active material, and the more power that can be achieved per unit length.

For example, when R is defined for MOF7 the $V_{eff}$ concept is extended by selecting R as the radius of the circle that has the same area formed by the seven hexagonal core cells, which is the most natural choice. The calculated $V_{eff}$ for MOF7s with three Δn values, closely matched to the fabricated fibers, are plotted in upper FIG. 12. Using the criteria for SIF, $V_{eff}$=2.4 is the SM cutoff, and the core is considered leaky below $V_{eff}$=1, where the fundamental mode confinement is <20%. Thus, for MOF7 with Δn=$-7\times10^{-4}$, the SM range is $V_{eff}$=[1, 2.4], corresponding to $d_{AH}$/Λ=[0.1, 0.2]. As is seen from lower FIG. 12, the modeling agreed well with the experimental data.

Figure 12:
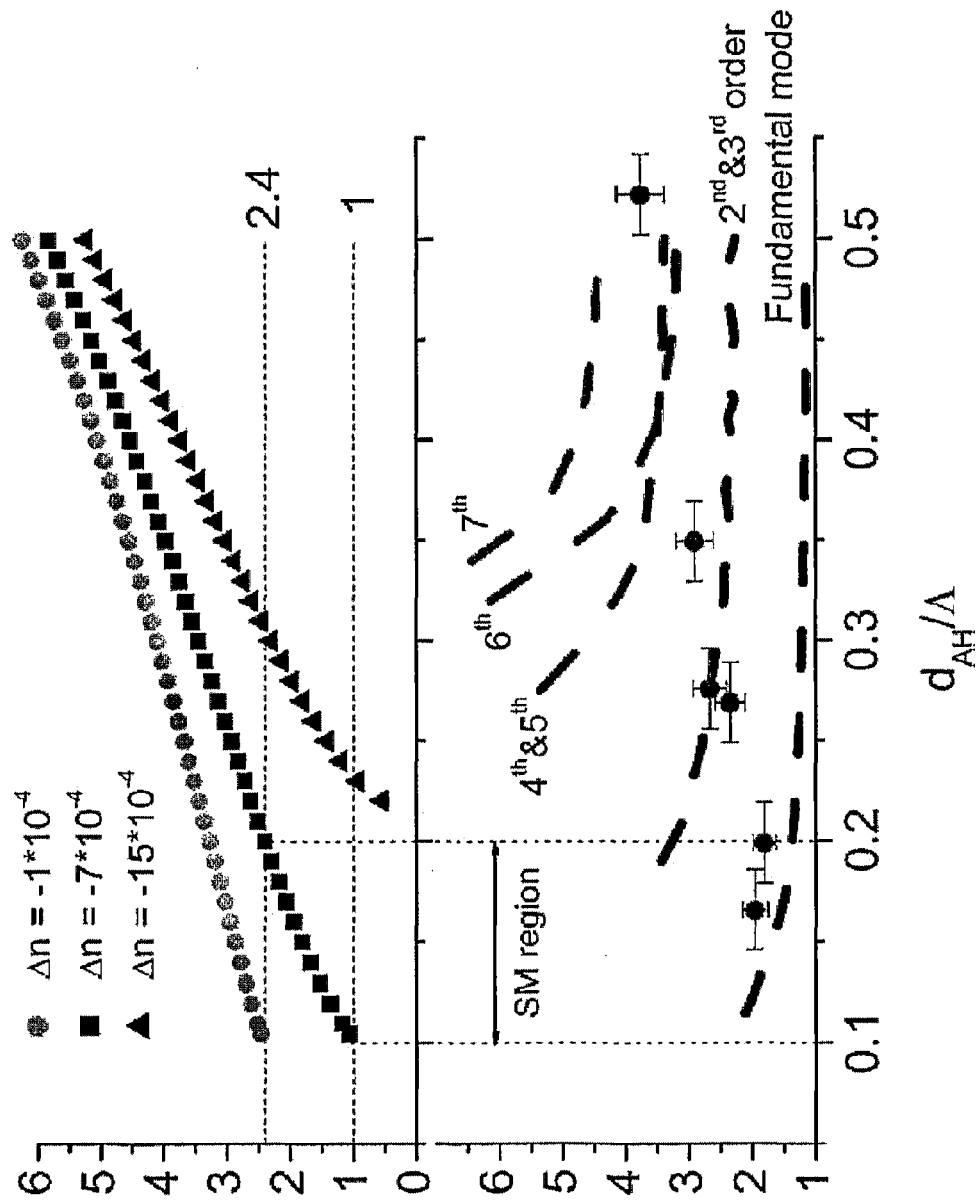
FIG. 12 is a depiction of upper calculated $V_{eff}$ of MOF7s with three $\Delta n$ values; lower, simulated (curves) and measured (dots) beam qualities for MOF7s with $\Delta n = -7 \times 10^{-4}$.

FIG. 12 also shows that MOFs with different Δn have similar modal behaviors, but at different $d_{AH}$/Λ regimes. When Δn is small ($-1\times10^{-4}$), the SM regime is within the small-holes region ($d_{AH}$/Λ<0.1). In addition, the beam is generally not of the best quality (FIG. 11). As Δn becomes larger ($-7\times10^{-4}$), the SM regime becomes broader, and the modal quality also improves. A further increase of Δn ($-15\times10^{-4}$) again reduces the SM regime. Thus, there exists at least one optimal Δn, about $-7\times10^{-4}$ in the present case, that has a reasonable SM range and is relatively easy to manufacture with large tolerance. The core-index-depressed MOF7 can provide SM operation but only within a certain $d_{AH}$/Λ range that is determined by Δn. This is in sharp contrast to the endless SM property of MOF1. The reduced SM regime of the MOF7s is not a surprise, since this tendency has been seen from the three-missing-hole MOFs. For some applications, this might offset the benefit in mode area enhancement, while for applications such as short-length high-power fiber lasers the gain in active core area in a MOF7 should clearly compensate for the present design parameters.

Thus, the modal property of phosphate LMA MOF7 with a depressed-index active core was shown and SM guiding was demonstrated from short MOF7 with an appropriate index profile and structure. Thus, practical ways have been demonstrated according to one aspect of the present invention to tailor the MOF modal property while providing flexibility in fiber design and relaxing conditions for index control.

As noted above, one of the most interesting properties of the recently developed microstructured optical fibers (MOFs), also known as photonic crystal or holey fibers, is their endless single-mode (SM) behavior. These MOFs have air holes that are arranged in a two-dimensional triangular pattern and run through the whole fiber length. Typically, one hole in the center of the periodic structure is intentionally ignored, which forms a solid core area surrounded by the patterned cladding. The optical characteristics of these MOFs are influenced by two relative length scales: d/Λ, where d is the hole diameter and Λ is the pitch (the center-to-center spacing of neighboring holes); and Λ/λ, with λ being the wavelength. It has been shown that MOFs provide SM guiding if the d/Λ ratio is below a certain limit (~0.45), regardless of the Λ/λ value.

In one embodiment of the present invention, a MOF fabricated of phosphate glass (PG) is realized. Though MOFs are most commonly made of silica, non-silica fibers have been investigated recently for their unique properties such as high non-linearity and high refractive index. PG is of particular interest owing to its high solubility of Er and Yb ions as well as its large phonon energy to assist $Er^{3+}$ $^4I_{11/2}$ to $^4I_{13/2}$ relaxation, which makes it a superior host glass for amplifier and laser applications at ~1.5 μm. A high-power SM PG fiber laser with a step-index core area of 150 μm² can be achieved. By applying the MOF approach to PG fiber, the potential to boost the output power can be achieve by expanding the core area considerably while preserving the beam quality.

The effect of fiber design parameters on beam quality in the present invention has been determined by drawing and testing fibers with either one or seven central holes missing, with the doped core glass having a slightly lower refractive index than the cladding glass as is discussed above. Based on these PG MOFs, cladding-pumped fiber lasers only a few centimeters in length were fabricated. Though other MOF lasers have been realized recently, all of them used several meters of $Yb^{3+}$-doped silica fibers, which produced core and cladding indexes that were closely matched. The short PG MOF laser of the present invention delivered more than 3 W of continuous wave (cw) output power, and the dependence of the output beam quality on the fiber geometry and the d/Λ ratio has been assessed.

Figure 13:
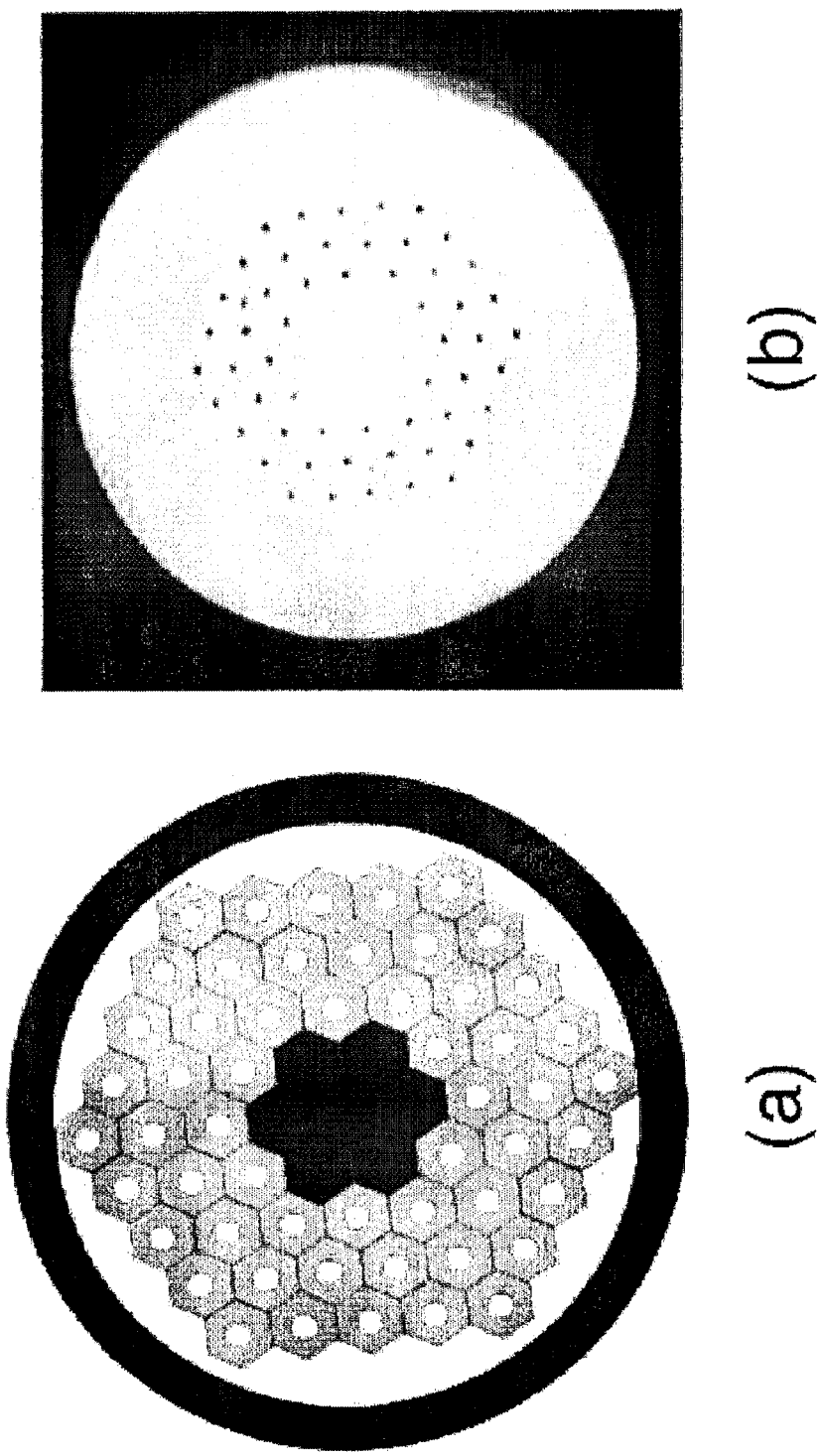
FIG. 13($a$) is an illustration of the stacking scheme.

In this embodiment, $P_2O_5$ was used as the glass former. The fibers were drawn using the stack-and-draw technique, such as previously described. Two different PG preforms are made; one bring undoped with a hole drilled in the center, and the other bring Er—Yb codoped without a hole. Both preforms are drawn to stacking cells, which are stacked together with the core cell(s) placed in the center, and the whole stack is inserted into a tube made of another undoped PG. The tube glass has a lower index to confine the pump light inside the patterned inner cladding. The stacked tube is drawn to obtain the MOF. FIG. 13(a) illustrates the stacked tube and FIG. 13(b) shows the drawn MOF with seven core cells. By adjusting the drawing temperature, MOFs are fabricated with an identical outer diameter (OD) and pitch Λ but different d/Λ ratios.

The MOF cores are doped at levels of $1.1 \times 10^{26}$ $Er^{3+}$ ions/m³ and $2.2 \times 10^{26}$ $Yb^{3b}$ ions/m³. Doping the core inevitably introduces an index difference ($\Delta n = n_{core} - n_{clad}$). Considering that (i) a positive core-cladding Δn brings the MOF back to the step-index fiber limitation and that (ii) the accuracy of the index measurement in this example is limited to $+5 \times 10^{-4}$, core and cladding glasses with $\Delta n = -7 \times 10^{-4}$, are chosen nominally. The MOFs are verified as having depressed-index cores because the cores show an anti-guiding property until the holes open to a certain size.

Working Examples

Lasers were constructed using 11-cm-long MOFs with both ends cleaved. The fiber lasers were cooled by a thermoelectric cooler to remove the generated heat. Up to 31 W of 975-nm pump light was delivered through a multimode fiber (core diameter of 105 μμm) whose output facet is coated. The coating is transparent at 975 nm and highly reflective at 1.5 μm. The coated pump fiber end was butt coupled against the MOF so that the pump light was effectively injected into the MOF cladding, and the coating serves as a high reflector for the laser cavity. The Fresnel reflection at the other end of the MOF serves as the output coupler. The output beam was monitored by a real-time beam profiler for the M² value measurement.

Figure 14:
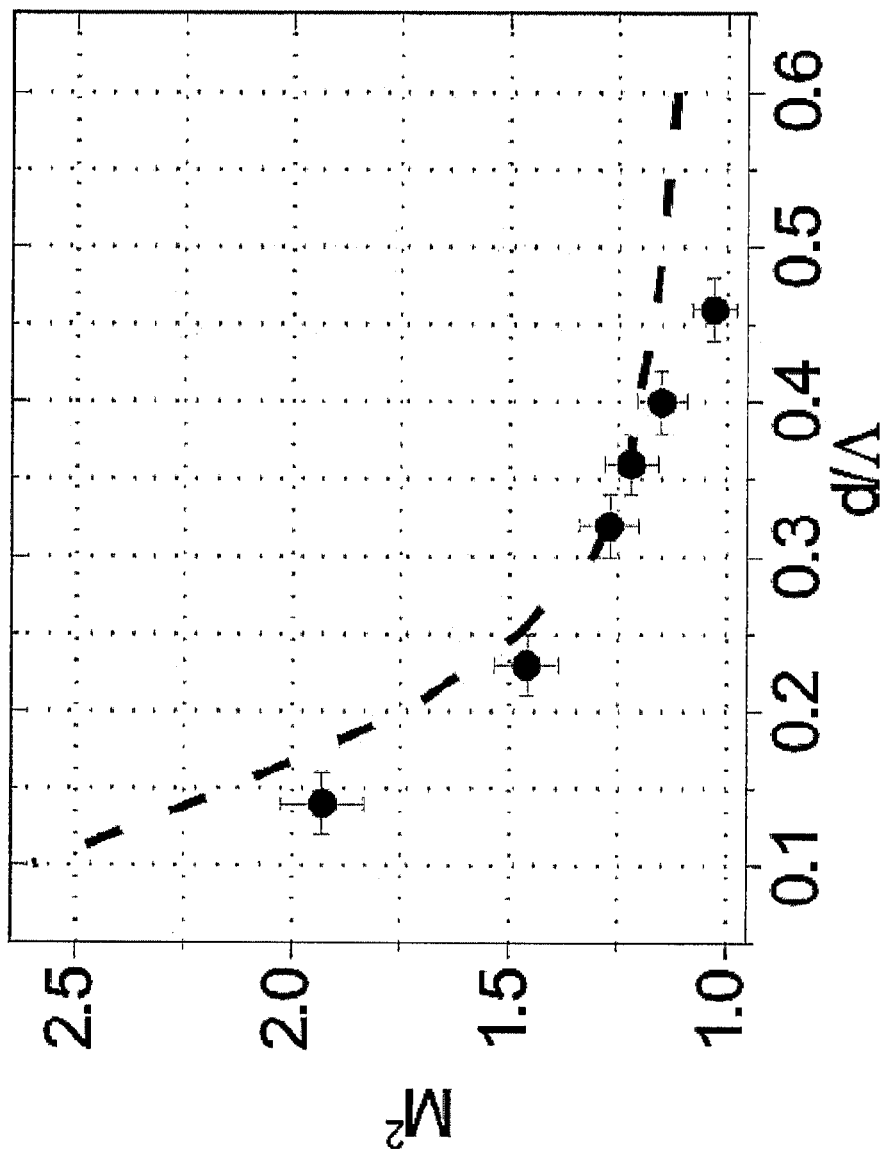
FIG. 14 is a graph of $M^2$ value versus d/Λ ratio for MOF1 lasers, the dots are data measured at 10 W of pump power, the dashed curve shows the calculated $M^2$ value of the fundamental mode, assuming $\Delta n = -7 \times 10^{-4}$ and Λ/λ=6.
Figure 15:
FIG. 15 is a schematic illustration of an example of fabrication stack-in-tube technique.
Figure 16:
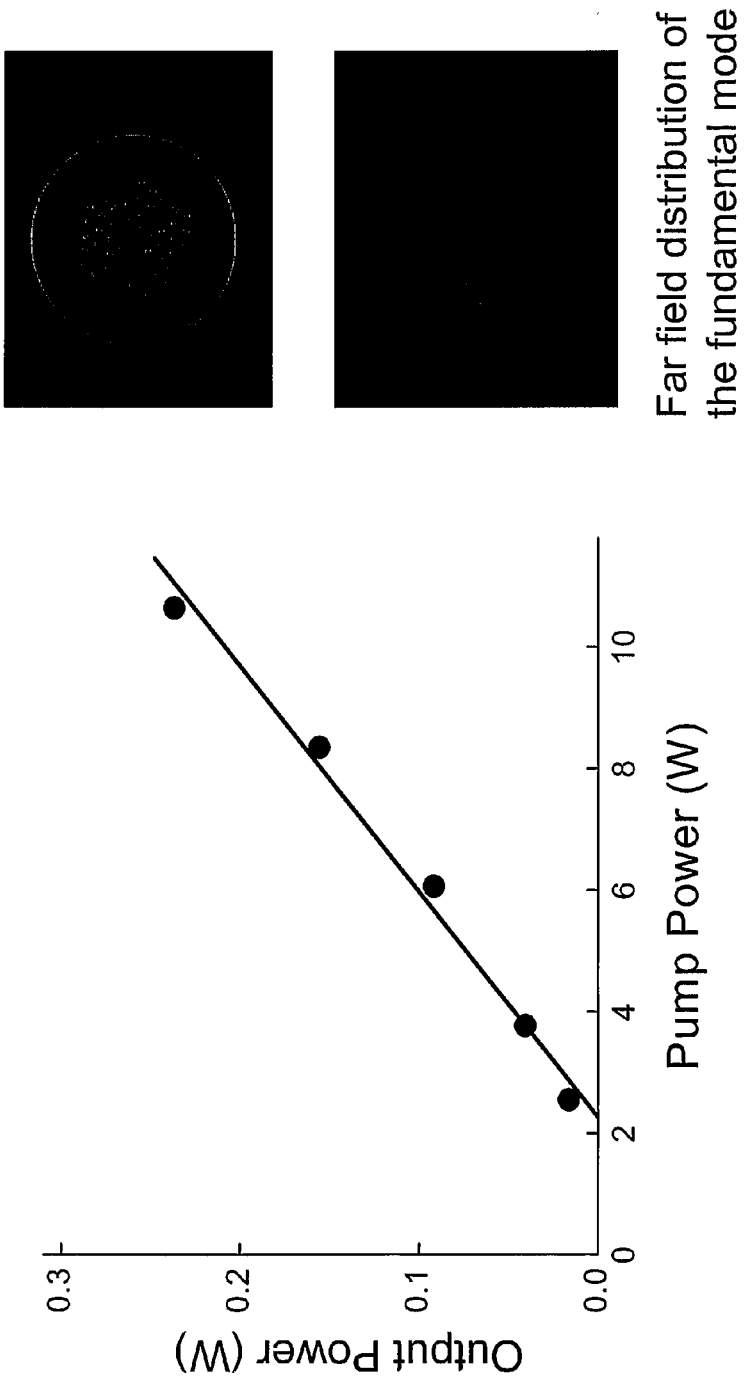
FIG. 16 is a graph of performance of a 10 cm long, 1-air-hole-missing micro-structured fiber laser.
Figure 17:
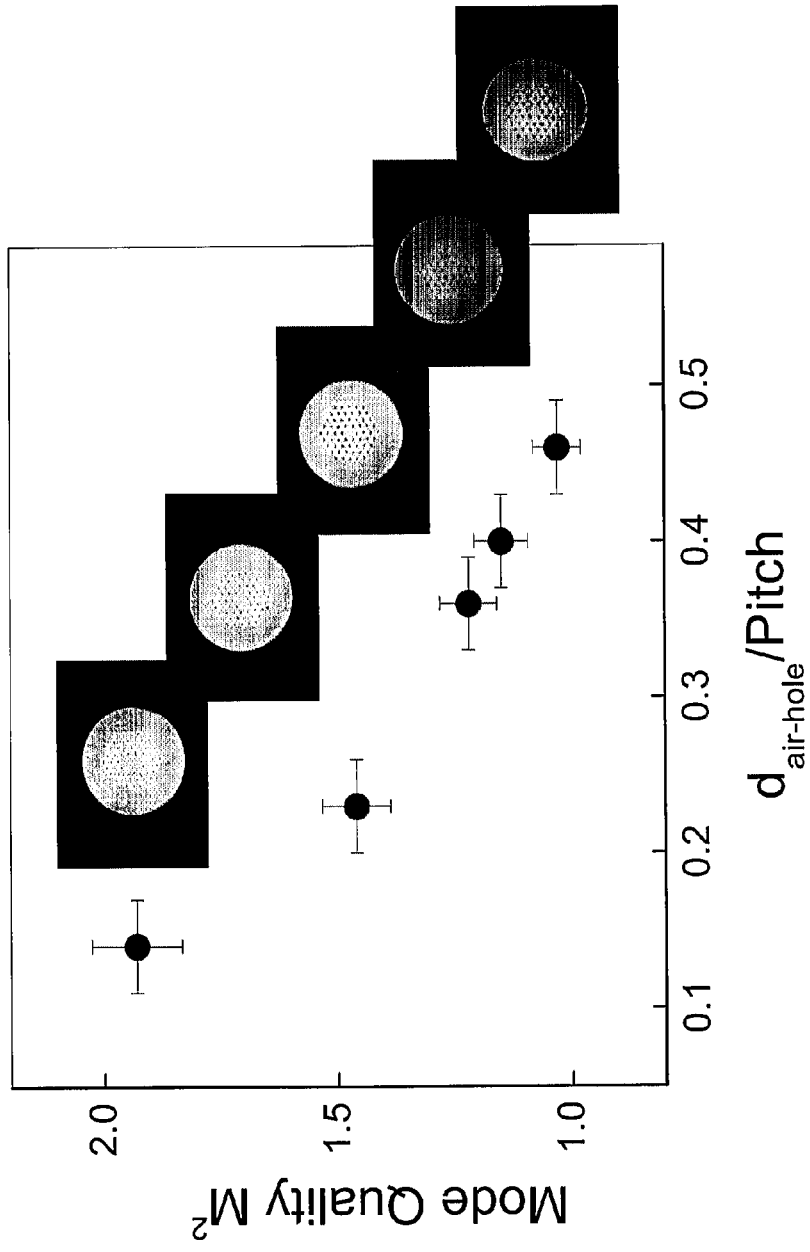
FIG. 17 is a graph of 1-hole-missing fiber laser spatial beam quality, fibers drawn with different d/Λ ratios, OD ~125 um.
Figure 18:
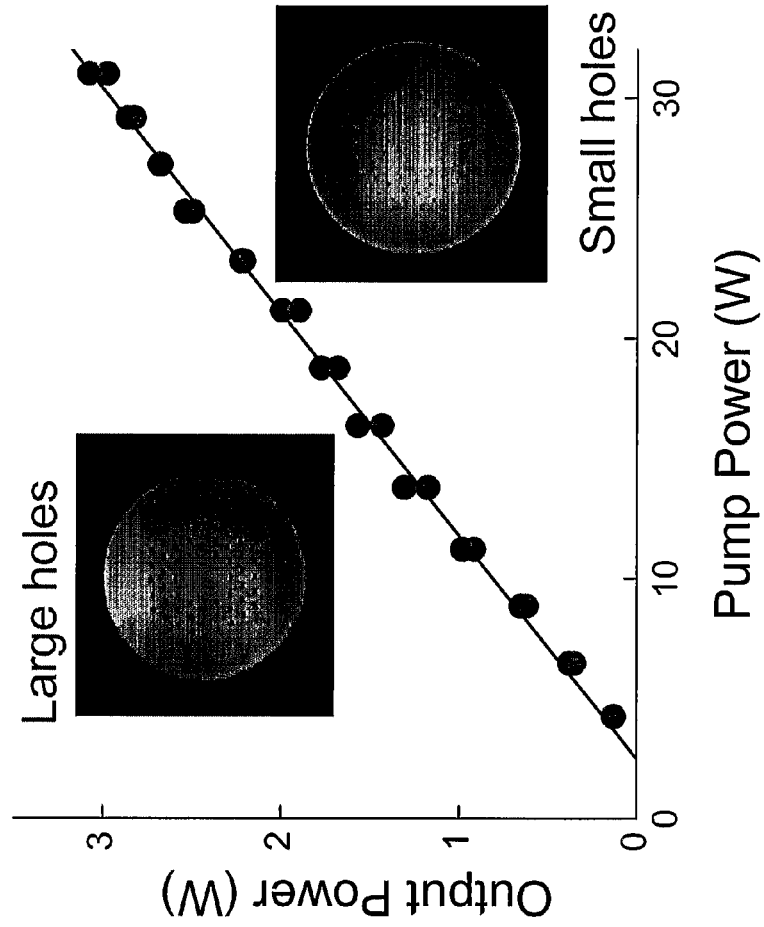
FIG. 18 is a graph of 10 cm long 7-hole-missing fiber laser performance.
Figure 19:
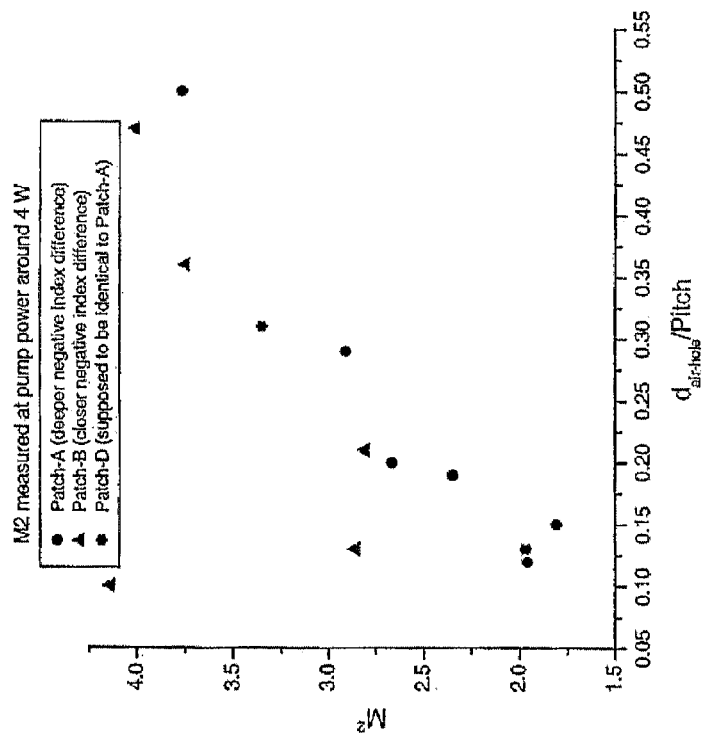
FIG. 19 is a graph of Fibers drawn with different d/Λ ratios & differently match index difference.
Figure 20:
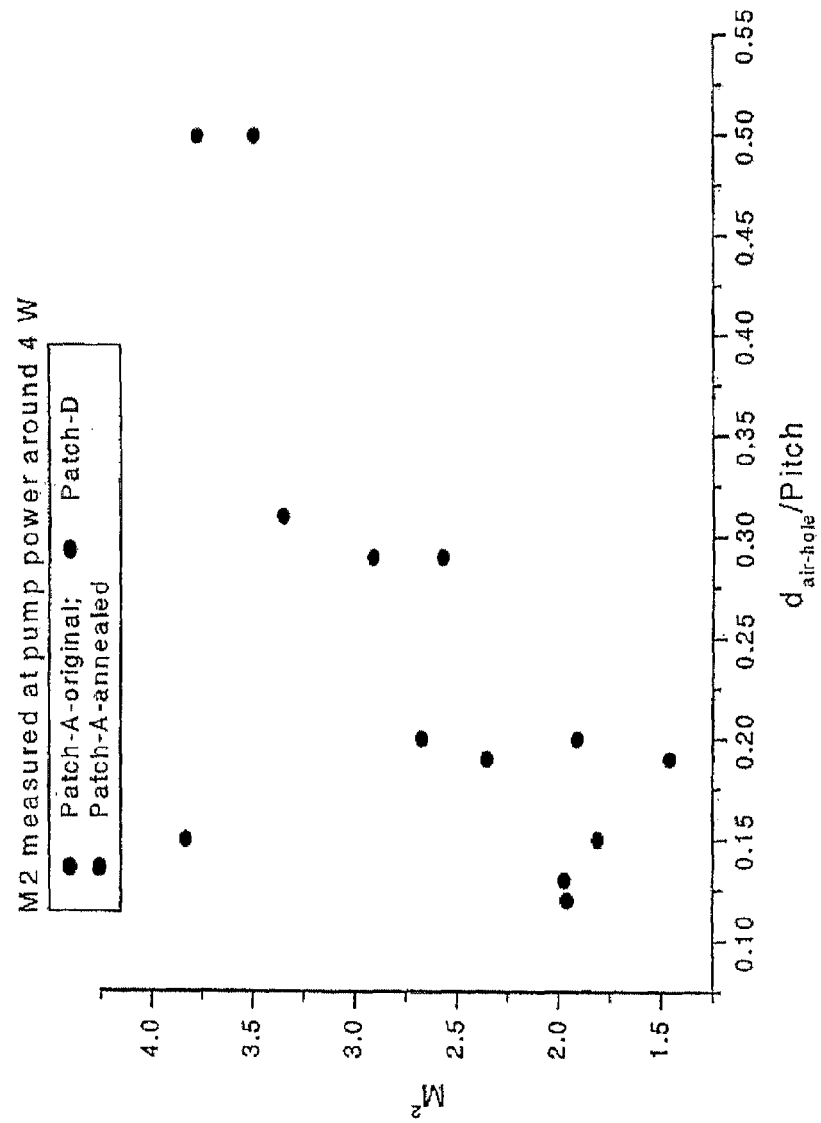
FIG. 20 is a graph of annealing the fiber laser to improve the beam quality.

Six different MOFs of one hole missing (MOF1) were drawn with d/Λ varying from 0.14 to 0.46, and their OD and Λ (pitch) are kept at 125 μm and 9 μm, respectively. SM outputs from all six MOF1 lasers are obtained as expected from the design parameters. However, since the fundamental mode of MOF1 differs considerably from a circularly symmetric Gaussian mode, both the modeling and the testing shows that its M² value can be considerably larger than 1, the value of an ideal Gaussian beam. The M² value increases with the reduced d/Λ ratio (FIG. 14), because of the less modal confinement caused by smaller holes. The output powers of MOF1 lasers are fairly low because of the small core areas of ~60 μm².

Figure 21:
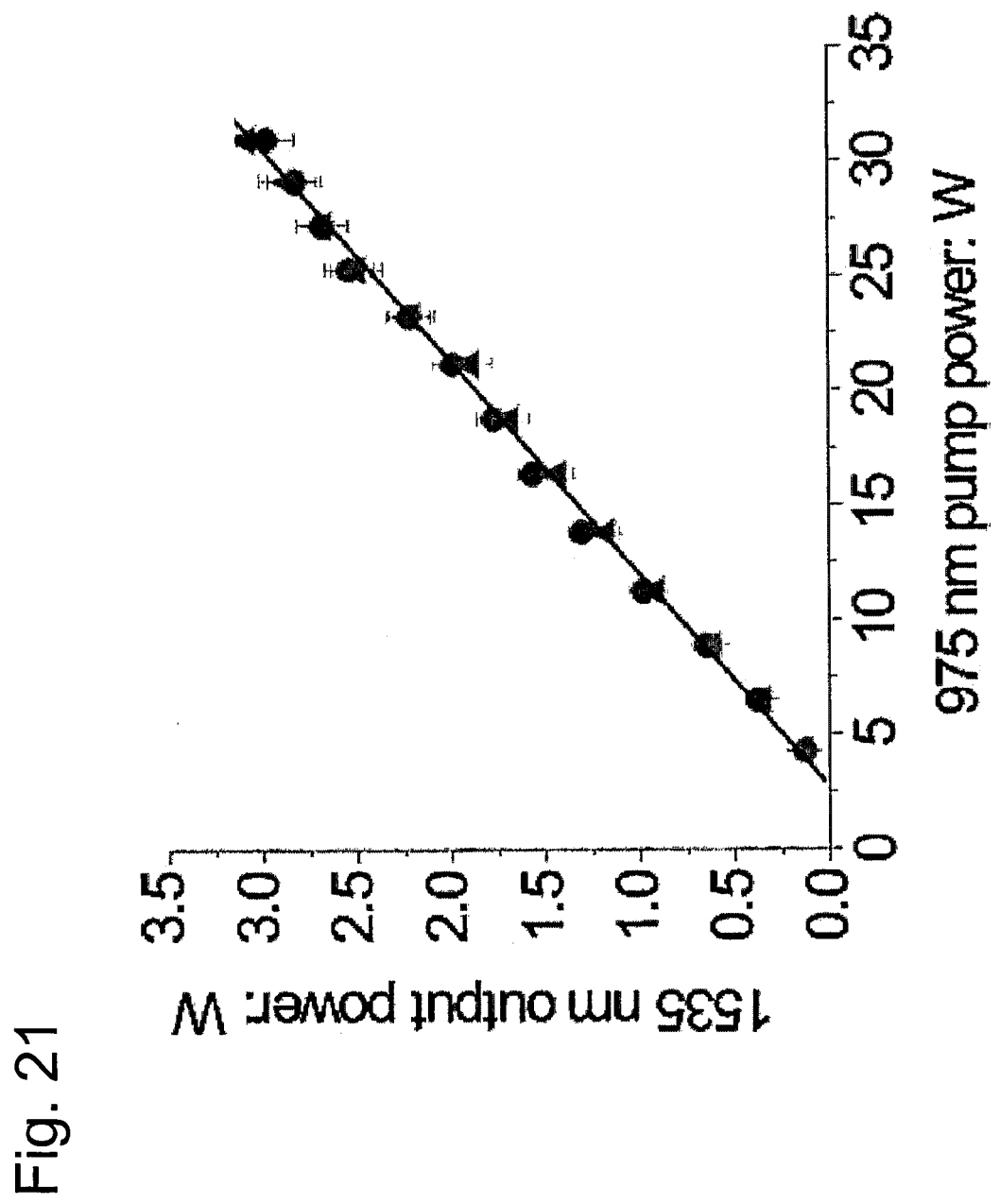
FIG. 21 is a graph of signal output versus pump power of two MOF7 lasers, the dots correspond to a MOF7 of d/Λ=0.19 and the triangles represent a MOF7 of d/Λ=0.50.

The power performance is boosted for MOFs with seven holes missing (MOF7) owing to the large increase in active core area. FIGS. 15-20 illustrate this actualization. With the same OD and Λ as MOF1, MOF7 has a core area of ~430 μm². The 11-cm-long MOF7 laser is able to generate 3.1 W of cw optical power at 1.53 μm, with 31 W of 975 nm pump light launched. FIG. 21 shows the signal versus pump plot for two MOF7 lasers with d/Λ of 0.50 and 0.19. Both fiber lasers produce almost identical output power characteristics. The output spectrum is centered at 1535 nm with a width of ~4 μm. The lasing threshold was <3 W, and the slope efficiency is ~11% against the launched pump power. The pump absorption coefficient and propagation loss co-efficient are measured to be 0.20 and 0.05 $cm^{-1}$, and the output-end pump leakage is <5%. Thus there is only a negligible benefit of working with a longer MOF7. The output power and slope efficiency can be dramatically increased if the cores are doped as high and the propagation loss is reduced by an improved fiber drawing process. It should be noted that ~10 W of fiber laser output from a 5-cm-long MOF laser with optimized doping and fabrication can be obtained.

Figure 22:
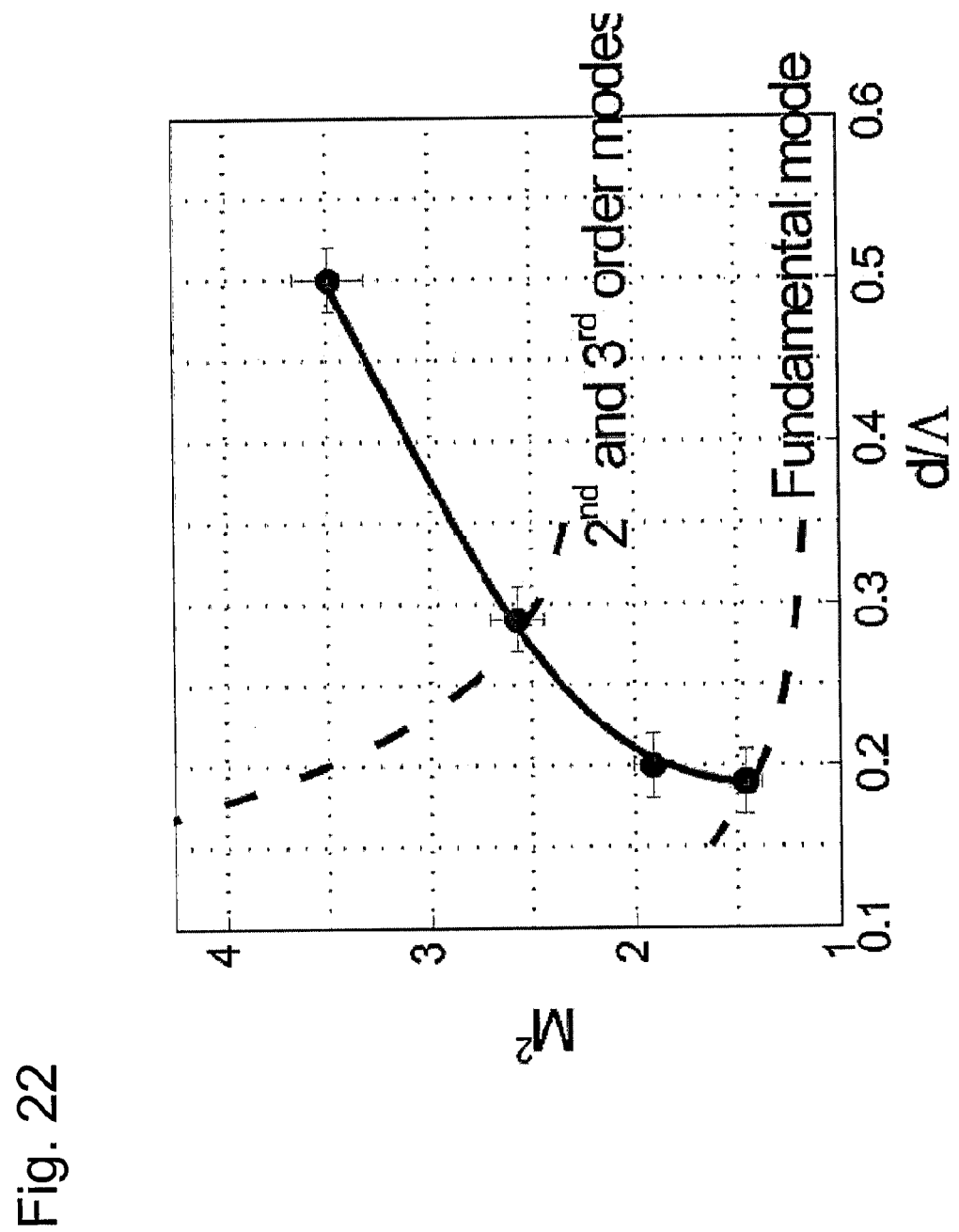
FIG. 22 is a graph of $M^2$ value versus d/Λ ratio for MOF7 lasers, dots, experimental, the solid curve is for visual assistance only, dashed curves, calculated $M^2$ values for the fundamental mode and second- and third-order modes.

For MOF7 lasers, the measured M² value decreased steadily when d/Λ shrank (FIG. 22), which is in striking contrast to the behavior of MOF1 (FIG. 2). At the smallest d/Λ=0.19, it was observed that M²<1.5. The M² value of the fundamental mode is calculated as well as those of the degenerated second- and third-order modes that could propagate in MOF7, shown as the dashed curves in FIG. 22. A MOF7 with a larger d/Λ supports several modes, whereas SM behavior can be approached for d≤0.2Λ. This presumption is supported by the observed far-field pattern, which had a bright central spot surrounded by six much dimmer spots seated at the hexagon vertices. This pattern is similar to that of the one-hole-missing MOF described above, and thus provides indication of fundamental mode operation of the MOF7. Improved beam quality for the MOF7 laser with smaller d/Λ does not result in any penalty with respect to output power, as demonstrated in FIG. 21. The plotted M² values were measured with a 4-W pump, and it is observed that a moderate increase at high-power operation; e.g., for MOF7 with d/Λ=0.19, the M² increases to almost 2.0 at the highest pump level. Thus, SM behavior and good beam quality can be preserved in the LMA MOF7, even though its core area is seven times as large as that of MOF1. The beam quality can be improved further by fine adjustment of d/Λ and Δn.

Thus, short-length cladding-pumped MOF lasers made of phosphate glass in one embodiment of the present invention have been realized. Single-mode operation has been demonstrated, and more than 3 W of cw output power has been obtained from an 11-cm-long active MOF with a core area of 430 μm². It is expected that fine adjustment of the MOF design, further expansion of the core region, and an increase of the doping level will result in a drastic increase of the output power while maintaining single-mode, near-diffraction-limited beam quality.

Further, PCF's with "one air hole missing" doped core and "seven air holes missing" core (similar to what is shown in FIG. 8) have been fabricated according to one embodiment of the present invention where the refractive index of the core glass is 7*10 smaller than the refractive index of the cladding glass. While the corresponding fibers with out air holes were clearly anti-guiding, single mode laser operation in structures with specific air hole sizes have been realized by the present invention.

In another working example, photonic crystal phosphate glass fiber with a large area Er—Yb co-doped core was used to create an all-fiber, Watt-level, cladding-pumped, single-frequency fiber laser. The fiber laser operates around 1.5 µm and contains only 3.8 cm of active fiber in a linear cavity. The 976 nm multimode pump light is converted with an efficiency of about 12%, and a maximum output power above 2.3 W is obtained.

Narrow linewidth, single-frequency lasers have a wide range of applications in optical sensor and communication systems. In particular, single-frequency lasers that operate around 1.5 µm are crucial devices due to their compatibility with optical fiber communication lines and a wide range of existing photonics components. With sufficient output powers single-frequency lasers also find applications in nonlinear optical devices, e.g., as pump sources for optical parametric amplifiers. The fabrication of compact, single-frequency fiber lasers in one embodiment of the present invention was realized by the use of fiber Bragg grating (FBG) that was for example directly written into single mode fiber cores. Exclusive oscillation of one laser mode in a linear cavity was achieved by combining short, rare-earth doped, single mode active fibers with narrow band FBGs.

Recently, a 200 mW single-frequency fiber laser has been demonstrated that utilizes highly doped phosphate glass to significantly increase the absorption of pump light within a few cm fiber. Phosphate glass allows for extremely large doping levels with negligible clustering effect and is consequently well-suited for compact single-frequency fiber lasers. In that study, the oscillator power was limited by the available single mode pump power that had been launched into the active fiber core. Although it is generally less efficient to absorb the pump light in a cladding pumping scheme, first few cm-long single-frequency fiber lasers have been demonstrated very recently using similar highly doped phosphate glasses as active material. For cladding, pumping multimode pump diodes with much higher power are available and scaling of the output power depends mainly on improved absorption through large-mode-area fiber designs.

Other Examples

In one embodiment of the present invention, a novel concept to increase the mode area while maintaining single transverse mode operation is the application of photonic crystal fibers (PCFs). PCFs include a regular array of air holes and a defect in its center which defines the core (as shown in FIG. 7). The photonic cladding can be used to tailor the optical properties of these fibers and achieve, e.g. large dispersion, broadband single mode guidance, and extremely small or large mode areas. Best studied PCFs with large mode areas are fibers where one central hole is replaced by a solid core. Experimentally, PCFs with the large single mode cores have been realized with designs where more than one central air hole is removed and mode diameters on the order of 2000 µm² have been demonstrated in case of seven missing central air holes.

In one embodiment of the present invention, a 1.5 µm fiber laser that utilizes a phosphate glass PCF with heavily Er/Yb co-doped large-mode-area core is realized. This single-frequency fiber laser goes beyond the application of standard step-index fibers in the active laser cavity. In contrast to previous work on cladding pumped single-frequency lasers that employed step-index active fibers, the extremely short PCF laser of the present invention does not exhibit any saturation for pump powers up to available 20 W. Single-frequency operation was achieved within a stable, single FBG configuration that does not require additional etalons and/or polarization management. These advances are the consequence of the large active volume in the PCF and the high density of active ions in the phosphate glass. More than 2.3 W of output power is generated using only 3.8 cm of active PCF within a 5.8 cm long all-fiber cavity.

The geometry of the linear-cavity single-frequency fiber laser is shown in FIG. 9. Three different fibers formed an all-fiber laser device that is held in a silicon U-groove. The silicon substrate in this embodiment is thermoelectrically cooled to provide effective heat dissipation during high power laser operation. 976 nm pump light from multimode semiconductor laser diodes is delivered through a multimode fiber with 105 µm core diameter, an outer diameter of 125 µm, and a numerical aperture of 0.22. The end facet of this fiber was coated with a dielectric stack of $SiO_2$ and $Ta_2O_5$ layers that transmits the pump light but acts as a high reflector at the lasing wavelength at 1.534 µm. The pump delivery fiber was butt-coupled to the active fiber.

The active fiber was a PCF fabricated from phosphate glass that allows for high levels of rear-earth doping. Both doped and undoped phosphate glasses were used and the fiber was drawn using the stack-and-draw technique. A cross-section of the active PCF is shown in lower left part of FIG. 9. The fiber includes a triangular pattern of 87 unit cells in the center that are surrounded by a solid outer cladding. The PCF has an outer diameter of 125 µm making it compatible with standard silica fibers. The PCF has been designed to form a large area core that supports only one transverse mode which is well-confined through the array of axial air holes that run along the fiber.

In particular, the recently introduced depressed-index core design of the present invention that permits for single mode operation at relaxed tolerances for refractive index control was applied. The PCF had an air hole period of 8 µm, air hole diameters of about 3.2 µm, and a nominal index difference between core and cladding glasses of $\Delta n = n_{core} - n_{clad} = -17 \times 10^{-4}$. The 7 central unit cells of the PCF that form the core have no air holes and includes solid core glass that is doped with $1.6 \times 10^{26}$ $Er^{3+}$ ions/m³ and $8.6 \times 10^{26}$ $Yb^{3+}$ ions/m³. This fiber design results in a large area of doped glass of about 430 µm² and a fundamental mode distribution that provides good overlap with the doped area. At the same time single transverse mode guiding is provided with a measured mode quality factor $M^2$ of approximately 1.2, which is slightly higher than unity due to deviation of the mode shape from a circular symmetric Gaussian intensity distribution.

Figure 23:
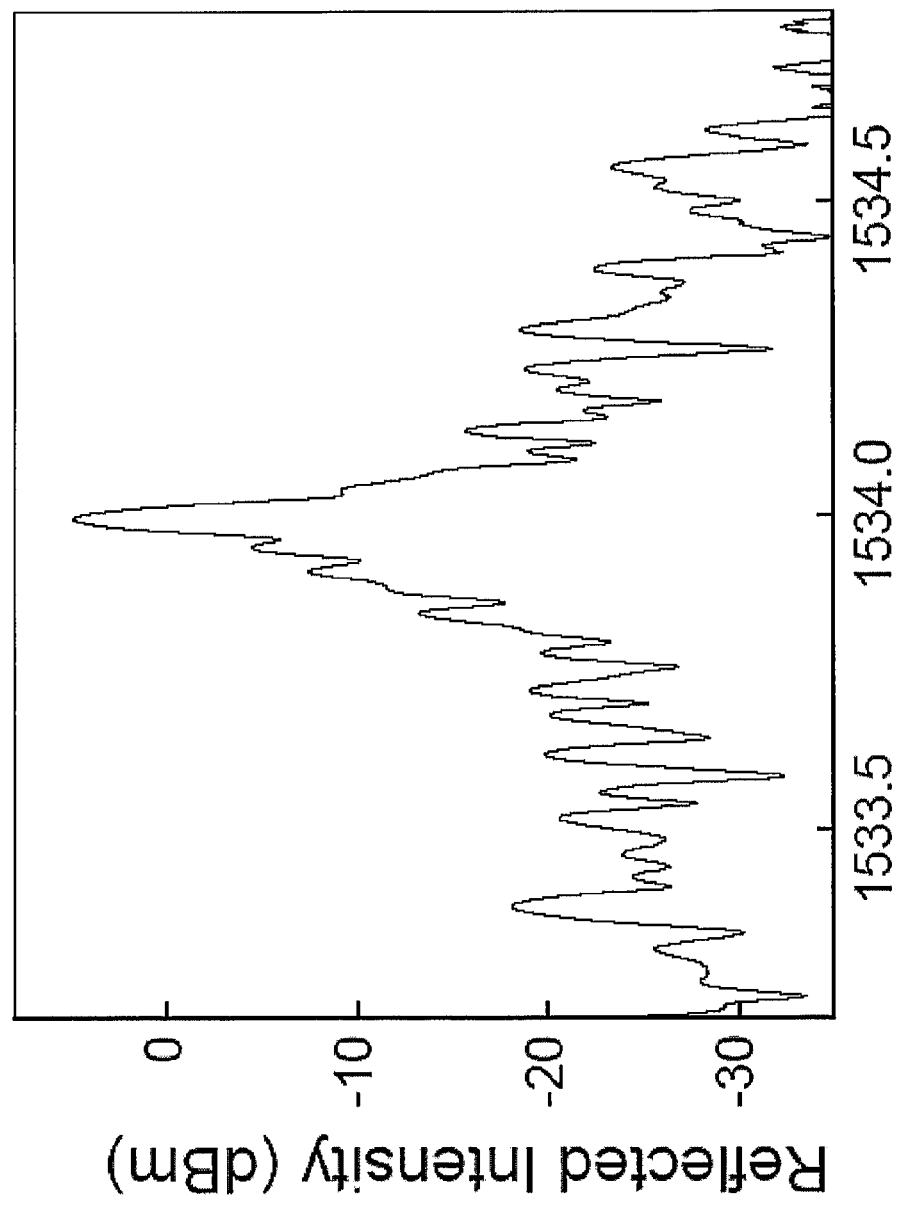
FIG. 23 is the reflection spectrum of the FBG used in the single-frequency laser, the FBG has a peak reflectivity of 17% at 1534 nm and a bandwidth of 0.03 nm.

In one embodiment of the present invention, at the fiber laser output side (left side in FIG. 9) the active fiber is spliced to a single mode silica fiber (Nufern PS-GDF-20/400) that has a large area photosensitive core. The nominal core diameter is 20 µm with a numerical aperture of 0.06. The original outer diameter of this fiber was 400 µm. To achieve a low loss fusion splice between the active phosphate PCF and the photosensitive silica fiber, the latter is etched to an outer diameter of 125 μm by hydrofluoric acid. In addition, in one embodiment, a short (<300 μm) buffer of coreless phosphate fiber is inserted between the PCF and the silica fiber to preserve the air holes in the PCF during fusion splicing. The fiber laser resonator is completed by a FBG written into the core of the silica fiber using 244 nm light and a 25 mm long phase mask. The reflection spectrum of the FBG in FIG. 23 shows a peak reflectivity of 17% at 1.534 μm and a 3-dB bandwidth of about 0.03 nm. Per roundtrip the complete fiber laser has a propagation loss of 3.8 dB due to the fusion splices and coupling losses between different fibers and the output loss is 7.7 dB. The roundtrip loss can be compensated by the large gain in the PCF with the highly doped, large area core.

Figure 24:
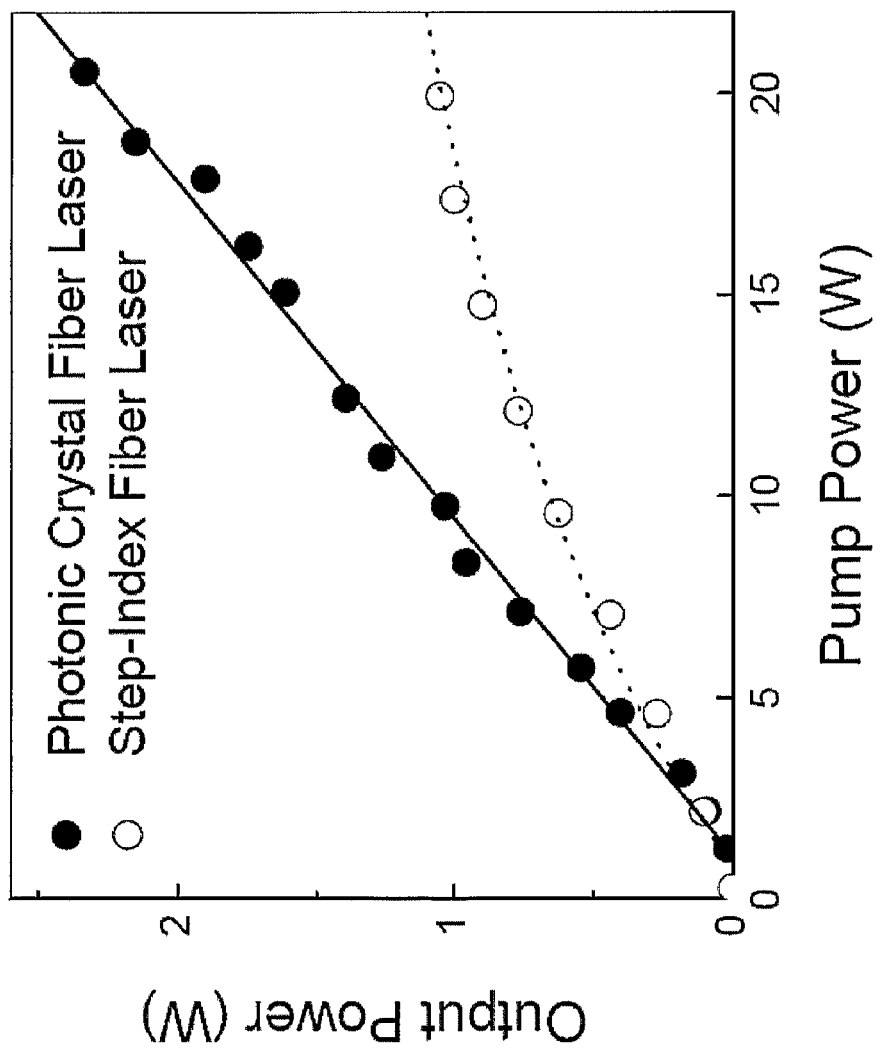
FIG. 24 is a graph of signal output vs. pump power of a fiber laser with only 3.8 cm of active PCF (filled circles), for comparison the performance of a similar laser using 4 cm of active step-index fiber is also shown (open circles), the lines are for eye guidance indicating no saturation for the PCF laser and a typical saturation behavior of the step-index fiber laser.

The output versus pump power characteristics of the single-frequency PCF laser is shown in FIG. 24. Measured by an optical spectrum analyzer the laser emission spectrum is a resolution limited narrow line centered at the 1534 nm reflection peak of the FBG. A slope efficiency of about 12% is observed up to pump powers of 20 W. In contrast, previously reported short length, single-frequency lasers show strong saturation effects at similar pump levels as illustrated by comparison with data from [14] in FIG. 24. A maximum output power over 2.3 W demonstrates the advantages of the present invention utilizing a large core PCF over conventional step-index fibers and indicates the potential of cladding pumped single-frequency fiber lasers.

Figure 25:
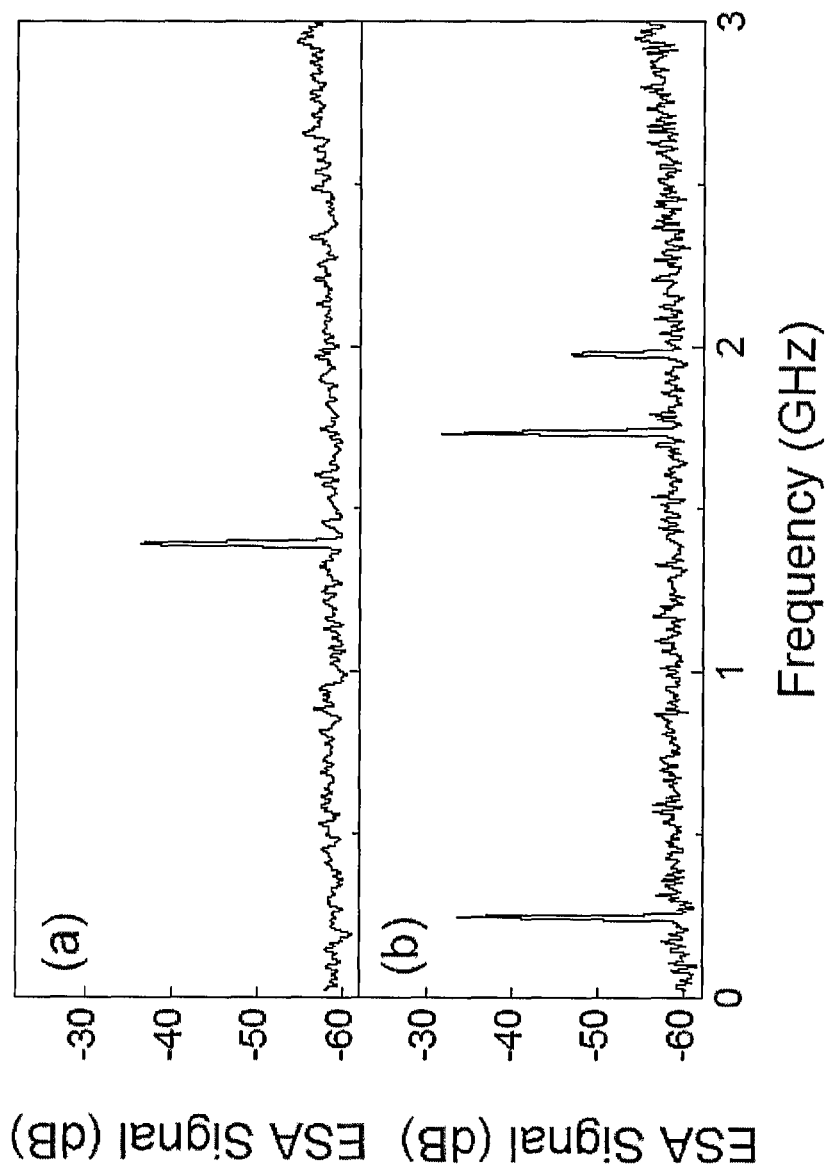
FIG. 25(a) is a RF beat signal of the PCF laser emission measured by an electrical spectrum analyzer at (a) single-frequency.
FIG. 25(b) is a RF beat signal of the PCF laser emission measured by an electrical spectrum analyzer at (b) multi-line operation.

To obtain more details on the laser emission, a heterodyne measurement was performed. A single-frequency signal from a high-accuracy (wavelength resolution of 0.1 pm) tunable diode laser is coupled to the fiber laser output and the resulting beat signal is analyzed using a radio frequency (RF) electrical spectrum analyzer (ESA). A typical RF spectrum collected during laser operation is shown in FIG. 25(a). Only one frequency component is observed within the full span of 3 GHz of the ESA.

This single-frequency operation indicates another advantage of using a PCF as the active fiber; the noncircular symmetry of the core inherently results in polarization mode discrimination while in step-index fibers external force or special polarization maintaining fiber is used to break the polarization degeneracy. Without any advanced temperature stabilization or vibration isolation the single-frequency operation of the fiber laser is very stable and virtually free of mode hopping up to pump levels of 10 W. Even at the higher pump levels single-frequency operation prevails, however, the laser operates from time to time at multiple emission lines as shown in FIG. 25(b). This multi-line operation permits obtaining the free spectral range (FSR) of the fiber laser cavity. The measured FSR of 1.74 GHz corresponds to a total cavity length of 5.8 cm. In addition, another transverse mode separated by 240 MHz appears in the RF spectrum of FIG. 25(b) which is assigned to the orthogonal polarization. The robustness of single-frequency operation can be further improved by accurate temperature control and improved mechanical stability.

Thus, a fiber laser that applies the concept of large core PCF to achieve single-frequency operation around 1.5 μm was shown in this embodiment. Combination high doping and large core area sufficient pump absorption is achieved over only 3.8 cm active fiber length even with cladding pumping. This concept of the present invention enables utilization of readily available, high power, multimode laser diodes to pump single-frequency fiber lasers and boost their output power to the level of several Watts.

In another working example, ultra-compact cladding-pumped fiber lasers were fabricated from single-mode phosphate glass microstructured optical fibers, with several Watts of cw output at 1.5 μm. In this example, a maximum cw output power of 4.7 W was achieved from a fiber laser that is only 35 mm in length, corresponding to a yield of 1.34 W per cm of active microstructured fiber.

Compact high-power fiber lasers at 1.5 μm, with watt-level cw output power generated from a few centimeter of active fibers, has attracted substantial interest recently. These devices are important elements for integrated photonics and excellent candidates for a high-power single-frequency (SF) laser source. Watt-level cw output powers have been achieved previously with active fibers 10 cm or shorter, with reported power yield of 1.33 W/cm from a multimode step index fiber (SIF) laser and 0.56 W/cm from a single-mode (SM) SIF laser, both are 7 cm in length. However, 7 cm is still too long for linear-cavity SF laser, and the fiber needs to be further shortened to 50 mm or less so that the free spectral range can match the bandwidth of narrow band fiber Bragg gratings.

The output power of the SM fiber laser in one embodiment of the present invention was mainly limited by the small core size due to SM requirement. The 13 μm diameter core of the previous SM-SIF laser is already considered large compared with those of most commercial SM fibers (~8 μm). Since the doping concentration can only be increased until the detrimental ion clustering effect takes place, the other option is to increase the core size while maintain SM guidance. Recently developed microstructured optical fiber (MOF) has been demonstrated for SM guidance with mode area much larger than that achievable by SIF, therefore provides an ideal solution to expand the active SM core area for both the $Yb^{3+}$-doped and $Er^{3+}$—$Yb^{3+}$-codoped fiber lasers.

In this example here, ultra-compact high-power SM fiber lasers, with lengths no more than 50 mm, were constructed with heavily doped phosphate MOFs along with optimized cavity designs. Over 5 W cw output power was obtained from a 50-mm-short MOF laser. The SM output power per length is greatly improved to 1.34 W/cm from a 35-mm-short fiber laser, which more than doubles the previously reported 0.56 W/cm from a SM-SIF laser. This clearly demonstrates the advantage of the MOF design over the conventional SIF in improving the device compactness as well as compressing the active fiber length sufficiently short for SF laser operation.

Figure 26:
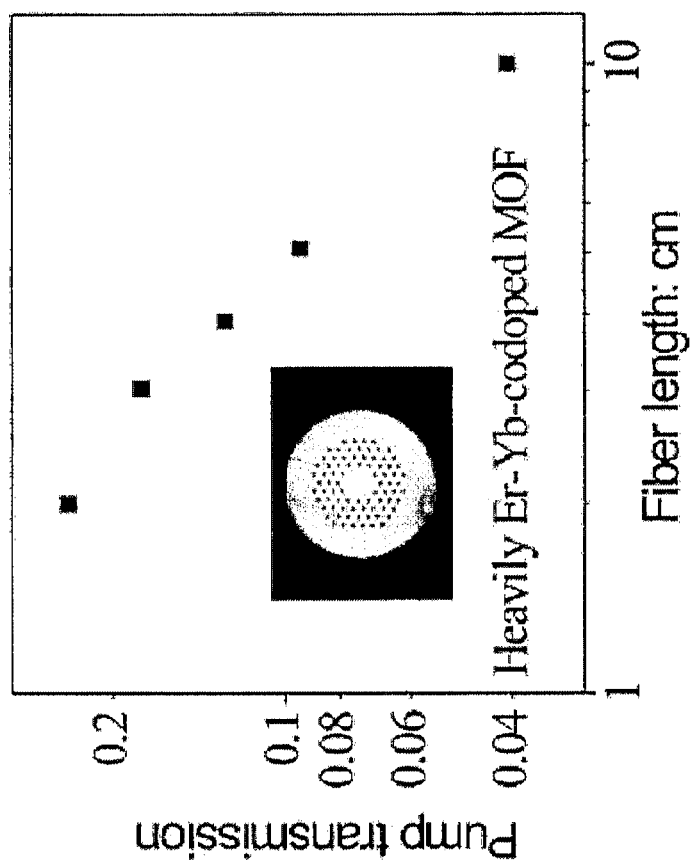
FIG. 26 is a pump absorption of the heavily doped cladding-pumped MOF in Log-Log scale. Inset: photo of the large-mode-area active MOF.

In one embodiment of the present invention, a phosphate MOF was used to construct a fiber laser using the stack and draw technique, as shown by inset of FIG. 26 and discussed above. The MOF had an outer diameter of 125 μm, a pitch, center-to-center spacing of neighboring air holes) of 9 μm, and a doped central area of ~430 μM² corresponding to a core diameter of 23 μm. This MOF had four rings of air holes surrounding the core, and the air hole diameter ($d_{AH}$) varies when drawn under different temperature. The index of the core glass was depressed by an amount of $\Delta n = n_{core} - n_{cladding} = -17 \times 10^{-4}$ to achieve SM guidance. When $d_{AH}/\Lambda$ reaches 0.4, the MOF guides only one spatial mode and the measured $M^2$ value of this mode is ~1.2. The deviation from the ideal value of 1.0 of a diffraction-limited beam is because the fundamental mode pattern of the MOF differs from the Gaussian mode.

The MOF core was doped with 1.5 wt. % $Er^{3+}$ and 8.0 wt. % $Yb^{3+}$. FIG. 26 shows the absorption of highly multimode 975 nm pump light coupled into the MOF cladding. Less than 10% of the pump light is transmitted through the first 5 cm of the active MOF, indicating that sufficient absorption can be achieved within a very short length. In addition, output couplers (OCs) with 100% reflectivity at 975 nm can be used to recycle the unabsorbed pump and further improve the laser efficiency. In one embodiment of the present invention, to operate this short heavily $Er^{3+}$—$Yb^{3+}$-codoped MOF laser, the generated heat, which is a consequence of strong pump absorption within a very small volume, was removed by having the MOF clamped inside a U-shaped silicon groove, which is attached to a thermoelectric cooler, to allow for efficient heat removal.

This fiber laser was constructed by laying a piece of MOF, with both ends cleaved, inside the heat sink. The pump is delivered by a butt-coupled multimode fiber whose facet is coated with a dielectric mirror (transparent at the pump wavelength of 975 nm and highly reflective at the signal wavelength of 1535 nm). The other end of the MOF is butted against a bulk OC that has high reflectivity at 975 nm and various reflectivities at 1535 nm, which have been optimized to maximize output power for MOF lasers of various lengths.

Figure 27:
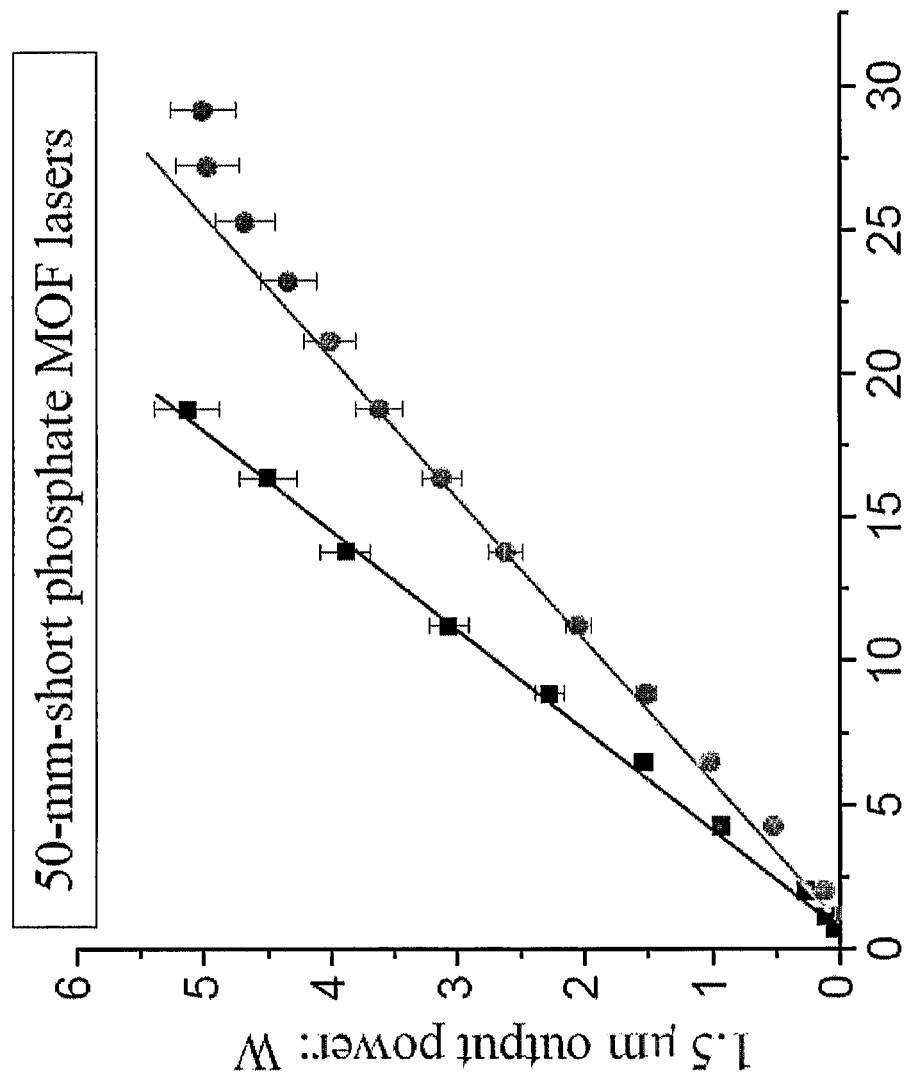
FIG. 27 is the performances of two 50-mm-short MOF lasers, squares: with external OC, dots: without OC, solid lines: linear fits.

In this example, two MOF lasers, both 50 nm in length, are first fabricated. The first has the bare cleaved facet as the output end and the other uses an OC ($R_{1535\,nm}$=54%). FIG. 27 shows the signal versus pump power plot of the two MOF lasers, and shows that the OC improves the laser efficiency significantly by at least 30%. The lasing threshold was less than 700 mW, and a maximum output of 5.1 W was obtained for the MOF laser with OC. The lasing wavelength is centered at 1535 nm and the bandwidth was ~2 nm. The output power of the 50-mm-short MOF laser started to saturate at ~5 W level, as seen form the MOF laser without OC.

The output of the MOF laser with OC actually dropped below the maximum at higher pump level because of irreversible thermal damage and is not plotted in the figure. Two reasons are possibly responsible for this saturation behavior at high pump levels. First, the pump absorption coefficient saturates with increasing pump power. Second, the so-called energy transfer "bottleneck" effect, which happens when the pump replenishes the $Yb^{3+}$ excited state faster than the forward energy transfer rate from $Yb^{3+}$ to $Er^{3+}$ ions at very high pump level, sets a limit on the output power. Both mechanisms are directly related to the number of active ions in the cavity as well as the forward energy transfer rate. By either increasing the active ion density or enhancing the energy transfer rate, the saturation behavior is alleviated.

Figure 28:
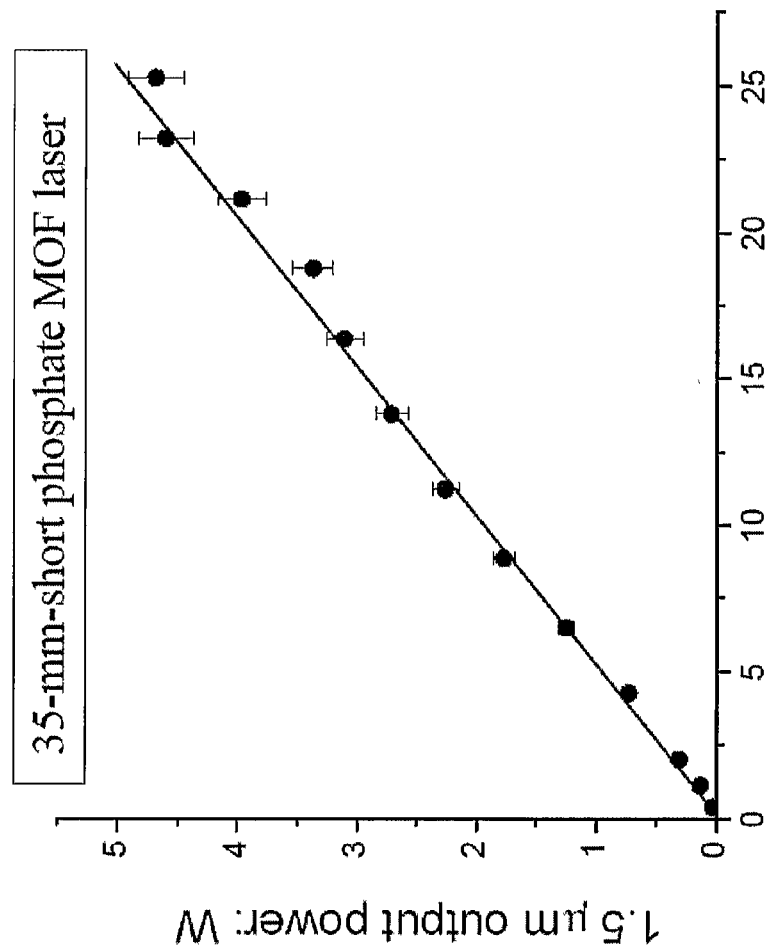
FIG. 28 is a graph of signal vs. pump plot of a 35-mm-short MOF laser, dots: experimental data, solid line: linear fit.

To further shorten the active fiber length, in one embodiment of the present invention, an OC with optimal reflectivity ($R_{1535\,nm}$=63%) was chosen for a MOF only 35 mm short. This MOF laser has, for example, a maximum 4.7 W cw output power at 21 W of pump. The lasing threshold is less than 400 mW and the slope efficiency was 20% with respect to the launched pump power. The signal versus pump power plot is shown in FIG. 28. The output saturation is also observed. This ultra-compact MOF laser has a yield of 1.34 W/cm and it provides a realistic chance for a multi-watt linear-cavity SF fiber laser with its very short length of 35 mm.

Therefore, a significant improvement on short-length 1.5 μm SM fiber laser was shown above. Combining large-mode-area SM-MOF design with heavily-doped phosphate glass, a cw output power of 5.1 W and a power yield of 1.34 W/cm is achieved from ultra-compact, 50-mm and 35-mm short, MOF lasers, respectively.

In another example of the present invention, active fibers with multiple doped cores have provided a convenient and promising power-scaling solution to compact high-power fiber laser devices. By distributing the gain medium at discrete positions inside the cladding, instead of concentrating all active ions into an oversized core, thermal issue is less of a concern for multicore fiber (MCF) laser with more optical power to be extracted per unit fiber length.

Figure 29:
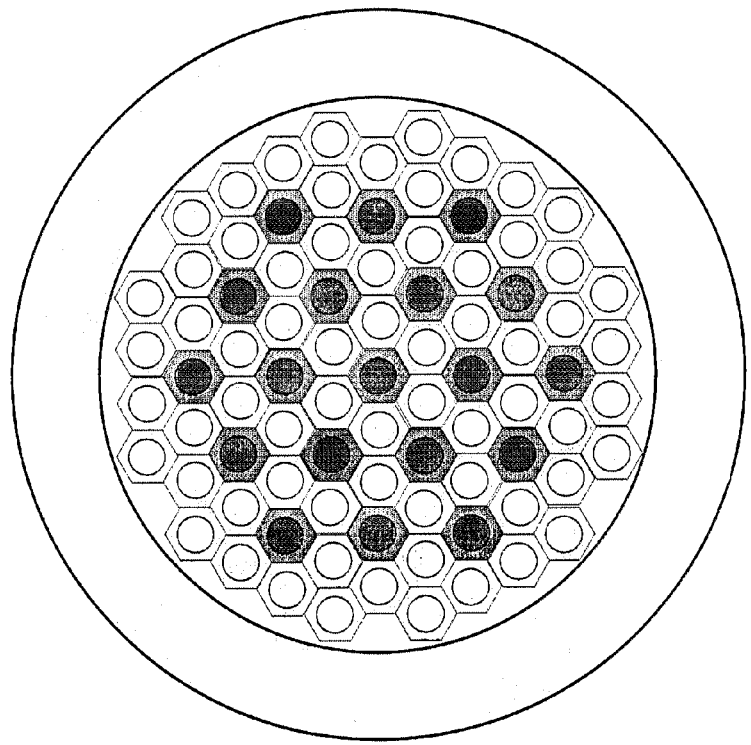
FIG. 29 is a schematic illustration of a multiple-core fiber with air holes in fiber cladding.
Figure 30:
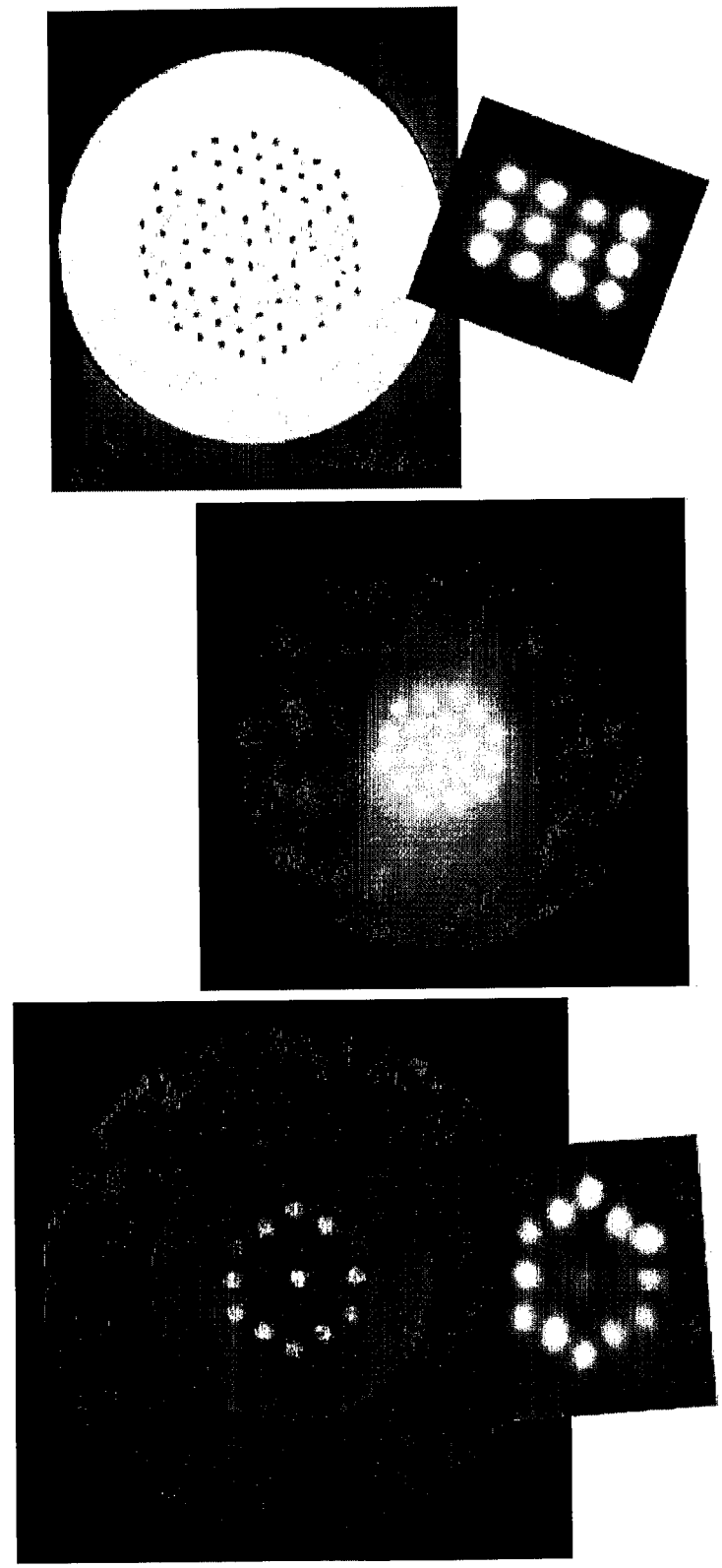
FIG. 30 is a schematic illustration of an example of several multi-core fibers.
Figure 31:
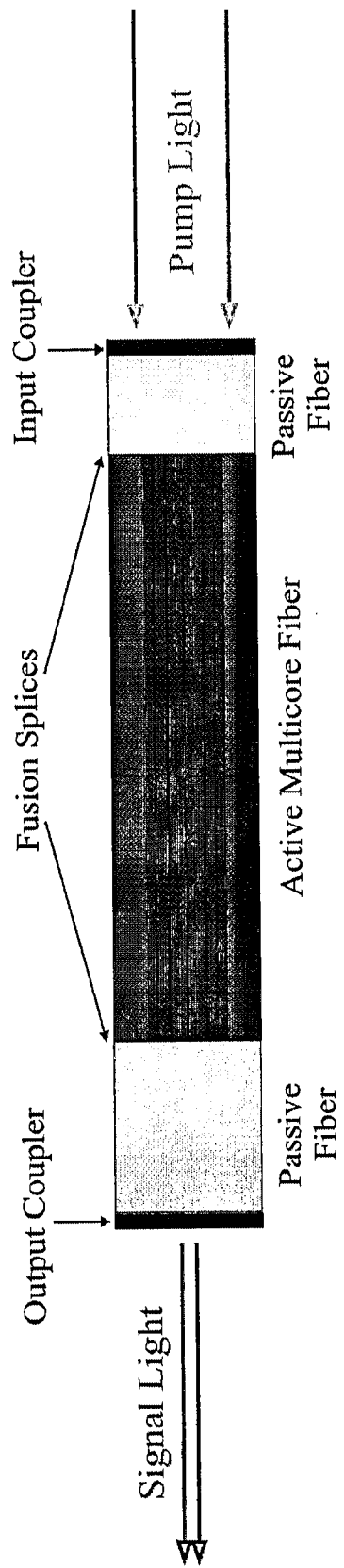
FIG. 31 is an illustration of the fiber laser device: both ends of the multicore fiber are spliced to passive fibers that are coated with dielectric mirrors (length not to scale)

In this embodiment of the present invention multiple cores that can be incorporation into a single fiber and emit laser light simultaneously are realized (FIGS. 29 and 30). The detailed structure of the MCF device of the present invention is illustrated in FIG. 31. Pump light is launched at one end into the MCF cladding, and the signal exits from the other end.

Figure 32:
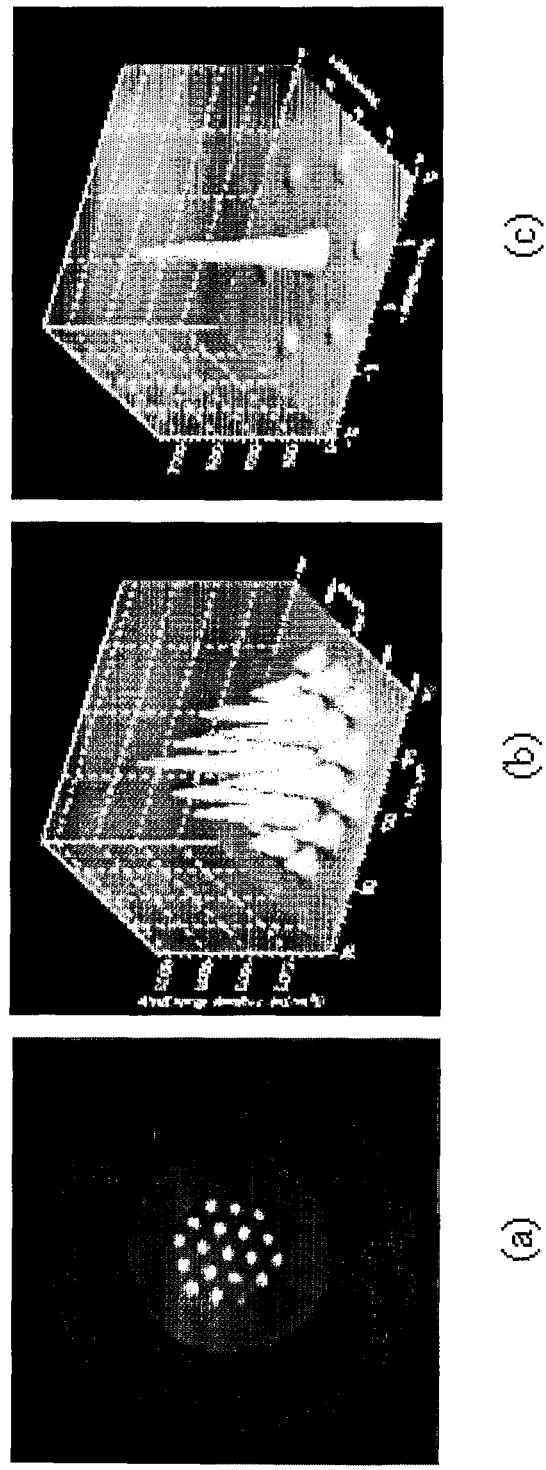
FIG. 32 is a microscopic image of the active 19-core fiber (a) with calculated near-field (b) and far-field (c) intensity distributions of the fundamental in-phase supermode.

Prototypes of this MCF laser device have been fabricated and tested. An active 19-core MCF (MC19), as shown in FIG. 32(a), has been used. The MC19 cores are made from heavily Er—Yb codoped phosphate glass, with 1.5 wt. % $Er_2O_3$ and 8.0 wt. % $Yb_2O_3$, which is designed for compact high-power fiber lasers. The MC19 has an outer diameter of 200 μm and a pump-confining inner cladding diameter of 110 μm. Each individual core has an effective diameter of 7.6 μm and a NA of 0.12 at 1.55 μm, and it is single mode with a full angular spread of 15°. The supermodes of this MC19 have been calculated using a finite element method with the near- and far-field intensity distributions of the in-phase supermode shown in FIGS. 32(b) and 32(c). The far-field distribution has a full angular spread of 2.4°, corresponding to a 47-μm-diameter effective waist for the Gaussian envelope of the in-phase supermode.

In this application, a short piece of MC19 (10 cm in length) is used as the gain fiber. A first fiber laser was built by a bare piece of MC19 without any modal control measure. By butt-coupling one end of the MC19 against a multimode pump-delivery fiber that had a broadband high-reflector (at ~1.5 μm) coated on its facet, the 975 nm pump light was launched into the MC19 cladding. The MC19 started to lase at a pump threshold of ~4 W.

Numerous modifications and variations on the present invention are possible in light of the above teachings. It is, therefore, to be understood that within the scope of the accompanying claims, the invention may be practiced otherwise than as specifically described herein.

The invention claimed is:
1. An optical device comprising:
    a central core region consisting of a first medium of a first refractive index n1;
    a cladding region exterior to the central core region, including a second medium having a second refractive index n2 higher than the first refractive index n1; and
    said cladding region including a third medium having a third refractive index n3 lower than the first refractive index n1, said third medium dispersed in the second medium to form a plurality of microstructures in the cladding region, the microstructures each being comprised of the second medium and the third medium,
    wherein said central core region is surrounded by an additional medium, the additional medium being surrounded by the cladding region.
2. The device of claim 1, wherein the cladding region and the core region comprise an optical fiber for transmission of light along a length of the fiber.
3. The device of claim 1, wherein the plurality of microstructures comprises a periodic array.
4. The device of claim 3, wherein the periodic array comprises at least one of a triangular array, a circular array, a square array, and a rectangular array.
5. The device of claim 1, wherein the third refractive index n3 is less than 2.0.
6. The device of claim 1, wherein the third medium comprises at least one of a polymer, liquid, and air.
7. The device of claim 1, wherein the cladding region and the core region comprise a stepped refractive index structure having a negative index change (n1−n2) between the first medium and the second medium that ranges from $-10^{-4}$ to $-10^{-3}$.

8. The device of claim 1, wherein at least one of the first, the second, and the third medium comprises at least one of a chalcogenide glass, a phosphate glass, and a fluoride glass.

9. The device of claim 1, wherein the cladding region and the core region comprise an optical fiber having a core area between 200 μm² and 4000 μm².

10. The device of claim 1, wherein the core region further comprises:
an absorption medium comprising a dopant configured to absorb incident radiation and generate photons through emission by dopant ions.

11. The device of claim 10, wherein the dopant comprises at least one of the rare earth elements, Er, Yb, Nd, Ho, and Pr, or metals such as Fe and Cr.

12. The device of claim 10, wherein the dopant comprises at least two of the rare earth elements, Er, Yb, Nd, Ho, and Pr, or metals such as Fe and Cr.

13. The device of claim 10, wherein the dopant comprises a concentration of at least $10^{20}$ cm².

14. The device of claim 1, wherein the cladding region and the core region comprise a laser, and further comprising:
an optical pumping device configured to irradiate an end of the laser.

15. The device of claim 1, wherein the cladding region and the core region comprise a laser, and further comprising:
an optical pumping device configured to irradiate a longitudinal side of the laser.

16. The device of claim 1, wherein the cladding region and the core region comprise a laser, and further comprising:
reflection coatings on ends of the laser, configured to transmit pumping light and partially reflect laser light from the interior of the laser.

17. The device of claim 1, wherein the cladding region and the core region comprise a laser, and further comprising:
a diffraction grating on an output end of the laser configured to partially reflect laser light from the interior of the laser.

18. The device of claim 1, wherein the cladding region and the core region comprise a laser, and further comprising:
a passive fiber coupled to the cladding region and the core region; and
reflection coatings on ends of the passive fiber, configured to transmit pumping light and partially reflect laser light from the interior of the laser.

19. The device of claim 1, wherein the optical device further comprises an outer cladding region surrounding the cladding region and composed of a fourth medium which comprises at least one of a chalcogenide glass, a phosphate glass, and a fluoride glass.

20. The device of claim 1, wherein the additional medium is formed in a polygon shape.

* * * * *